United States Patent
Nonaka et al.

(10) Patent No.: US 11,175,599 B2
(45) Date of Patent: Nov. 16, 2021

(54) ELECTROPHOTOGRAPHIC PHOTORECEPTOR, MANUFACTURING METHOD OF ELECTROPHOTOGRAPHIC PHOTORECEPTOR, PROCESS CARTRIDGE, AND ELECTROPHOTOGRAPHIC APPARATUS

(71) Applicant: CANON KABUSHIKI KAISHA, Tokyo (JP)

(72) Inventors: Masaki Nonaka, Toride (JP); Haruki Mori, Ichikawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/552,271

(22) Filed: Aug. 27, 2019

(65) Prior Publication Data

US 2020/0096883 A1 Mar. 26, 2020

(30) Foreign Application Priority Data

Sep. 20, 2018 (JP) ............................. JP2018-176217

(51) Int. Cl.
*G03G 5/047* (2006.01)
*G03G 5/05* (2006.01)
(Continued)

(52) U.S. Cl.
CPC .......... *G03G 5/0578* (2013.01); *G03G 5/047* (2013.01); *G03G 5/0546* (2013.01);
(Continued)

(58) Field of Classification Search
CPC ............... G03G 5/147; G03G 5/14713; G03G 5/14721; G03G 5/14726; G03G 5/14786
See application file for complete search history.

(56) References Cited

U.S. PATENT DOCUMENTS

| | | | | |
|---|---|---|---|---|
| 7,553,594 B2 * | 6/2009 | Ogaki | .................. | G03G 5/0539 399/159 |
| 7,838,190 B2 | 11/2010 | Ogaki | | |
| 2011/0076605 A1 * | 3/2011 | Doi | ........................ | G03G 5/071 430/58.7 |

FOREIGN PATENT DOCUMENTS

| | | |
|---|---|---|
| JP | 2005043818 A | 2/2005 |
| JP | 4436456 B2 | 3/2010 |

(Continued)

*Primary Examiner* — Peter L Vajda
(74) *Attorney, Agent, or Firm* — Rossi, Kimms & McDowell LLP

(57) ABSTRACT

Provided is an electrophotographic photoreceptor, which is excellent in abrasion resistance and scratch resistance, has excellent electrical characteristics, and is capable of inhibiting an image defect, a manufacturing method of an electrophotographic photoreceptor, a process cartridge, and an electrophotographic apparatus. A surface layer of the electrophotographic photoreceptor contains a copolymer of a composition which contains resin particles containing fluorine atoms, a charge transport compound having 2 or more polymerizable functional groups, a compound represented by General Formula (1), and a resin having a structure represented by General Formula (2) and a structure represented by General Formula (3). The polymerizable functional groups t are independently selected from an acryloyloxy group and a methacryloyloxy group, and a content of the compound represented by General Formula (1) in the composition is 0.10% by mass or more.

General Formula (1)

(Continued)

-continued

General Formula (2)

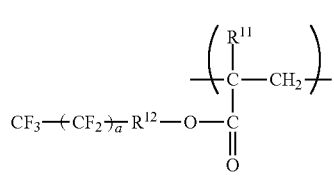

General Formula (3)

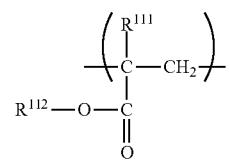

(51) Int. Cl.
G03G 13/06 (2006.01)
G03G 13/045 (2006.01)
C08L 33/08 (2006.01)
C08L 83/04 (2006.01)

(52) U.S. Cl.
CPC ........... G03G 13/045 (2013.01); G03G 13/06 (2013.01); *C08L 33/08* (2013.01); *C08L 83/04* (2013.01)

(56) References Cited

FOREIGN PATENT DOCUMENTS

| | | |
|---|---|---|
| JP | 2016090593 A | 5/2016 |
| JP | 2017142336 A | 8/2017 |
| JP | 2018077450 A | 5/2018 |
| WO | 2008053904 A1 | 5/2008 |

* cited by examiner

10 Claims, 5 Drawing Sheets

ELECTROPHOTOGRAPHIC PHOTORECEPTOR, MANUFACTURING METHOD OF ELECTROPHOTOGRAPHIC PHOTORECEPTOR, PROCESS CARTRIDGE, AND ELECTROPHOTOGRAPHIC APPARATUS

BACKGROUND

The present disclosure relates to an electrophotographic photoreceptor, a manufacturing method of the same, and a process cartridge and an electrophotographic apparatus which have the electrophotographic photoreceptor.

DESCRIPTION OF THE RELATED ART

In recent years, in order to improve the durability of an organic electrophotographic photoreceptor (hereinafter, simply referred to as "electrophotographic photoreceptor"), a curable resin has been used in the layer as an uppermost surface (hereinafter, referred to as "surface layer").

Japanese Patent Application Laid-Open No. 2005-043818 discloses a technique of incorporating particles having water repellency and/or lubricity and a dispersant into a curable resin obtained from a charge transport compound having a polymerizable functional group so as to improve surface slipperiness and image deletion.

International Publication No. WO2008/053904 discloses a technique of using a specific dispersant so as to ameliorate the dispersibility of resin particles containing fluorine atoms.

Japanese Patent Application Laid-Open No. 2018-077450 describes a case where a dispersion liquid obtained from resin particles containing fluorine atoms and a specific dispersant is used in a surface layer including a curable resin.

However, the electrophotographic photoreceptor according to Japanese Patent Application Laid-Open No. 2005-043818, International Publication No. WO2008/053904, and Japanese Patent Application Laid-Open No. 2018-077450 described above still needs to be further improved in terms of one of the change of electrical characteristics and the surface lubricity.

SUMMARY

An aspect of the present disclosure is directed to providing an electrophotographic photoreceptor which is excellent in abrasion resistance and scratch resistance, has excellent electrical characteristics, and is capable of inhibiting the occurrence of an image defect. Another aspect of the present disclosure is directed to providing a manufacturing method of an electrophotographic photoreceptor which is excellent in abrasion resistance and scratch resistance, has excellent electrical characteristics, and is capable of inhibiting the occurrence of an image defect. Still another aspect of the present disclosure aims to provide a process cartridge which contributes to the formation of a high-quality electrophotographic image. Yet another aspect of the present disclosure is directed to providing an electrophotographic apparatus which is capable of forming a high-quality electrophotographic image.

According to an aspect of the present disclosure, there is provided an electrophotographic photoreceptor including a support and a photosensitive layer, in which a surface layer of the electrophotographic photoreceptor contains a copolymer of a composition which contains resin particles containing fluorine atoms, a charge transport compound having 2 or more polymerizable functional groups, a compound represented by General Formula (1).

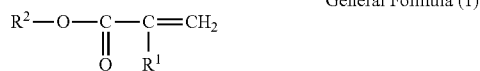

General Formula (1)

(in General Formula (1), $R^1$ represents one of a hydrogen atom and a methyl group, and $R^2$ represents an alkyl group having 3 or more to 6 or less carbon atoms), and a resin having a structure represented by General Formula (2) and a structure represented by General Formula (3),

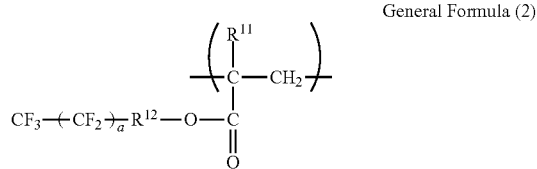

General Formula (2)

(in General Formula (2), $R^{11}$ represents one of a hydrogen atom and a methyl group, $R^{12}$ represents an alkylene group having 1 or more to 4 or less carbon atoms, and a is any integer among 3 to 5),

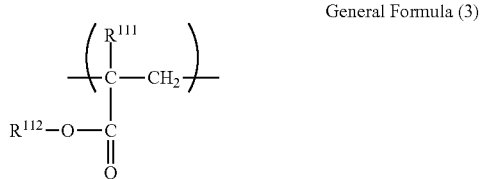

General Formula (3)

(in General Formula (3), $R^{111}$ represents one of a hydrogen atom and a methyl group, and $R^{112}$ represents an alkyl group having 1 or more to 9 or less carbon atoms), the polymerizable functional groups are independently selected from an acryloyloxy group and a methacryloyloxy group, and a content of the compound represented by General Formula (1) in the composition is 0.10% by mass or more.

According to another aspect of the present disclosure, there is provided a manufacturing method of an electrophotographic photoreceptor, including preparing a coating liquid for a surface layer, forming a coating film of the coating liquid for a surface layer, and forming a surface layer of an electrophotographic photoreceptor by curing the coating film, in which the coating liquid contains a copolymer of a composition which contains resin particles containing fluorine atoms, a charge transport compound having 2 or more polymerizable functional groups, a compound represented by the General Formula (1), and a resin having a structure represented by General Formula (2) and a structure represented by General Formula (3), the polymerizable functional groups are independently selected from an acryloyloxy group and a methacryloyloxy group, and a content of the compound represented by the General Formula (1) in the composition is 0.10% by mass or more.

According to still another aspect of the present disclosure, there is provided a process cartridge which supports the electrophotographic photoreceptor and at least one unit selected from the group consisting of a charging unit, a developing unit, a transfer unit, and a cleaning unit as a whole and is detachably mounted on the body of an electrophotographic apparatus.

According to yet another aspect of the present disclosure, there is provided an electrophotographic apparatus having the electrophotographic photoreceptor, a charging unit, an exposing unit, a developing unit, and a transfer unit.

Further features of the present invention will become apparent from the following description of exemplary embodiments with reference to the attached drawings.

DESCRIPTION OF THE EMBODIMENTS

Figure 1A:
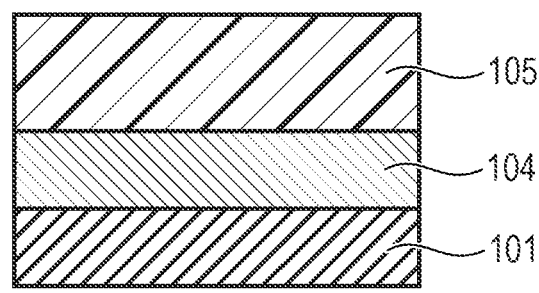
FIG. 1A is a view illustrating an example of layer configuration of an electrophotographic photoreceptor according to an embodiment of the present disclosure.

Hereinafter, based on suitable embodiments, the electrophotographic photoreceptor, the manufacturing method thereof, the process cartridge, and the electrophotographic apparatus according to the present disclosure will be specifically described.

The electrophotographic photoreceptor according to the present disclosure has a support and a photosensitive layer.

A surface layer of the electrophotographic photoreceptor contains a copolymer of a composition which contains resin particles containing fluorine atoms, a charge transport compound having 2 or more polymerizable functional groups, a compound represented by General Formula (1),

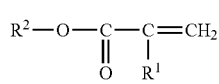
General Formula (1)

(in General Formula (1), $R^1$ represents one of a hydrogen atom and a methyl group, and $R^2$ represents an alkyl group having 3 or more to 6 or less carbon atoms), and a resin having a structure represented by General Formula (2) and a structure represented by General Formula (3).

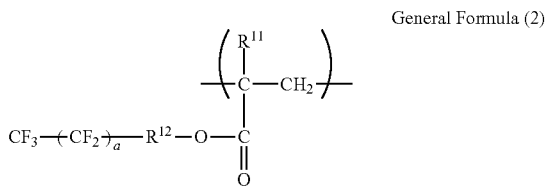
General Formula (2)

(in General Formula (2), $R^{11}$ represents one of a hydrogen atom and a methyl group, $R^{12}$ represents an alkylene group having 1 or more to 4 or less carbon atoms, and a is any integer among 3 to 5),

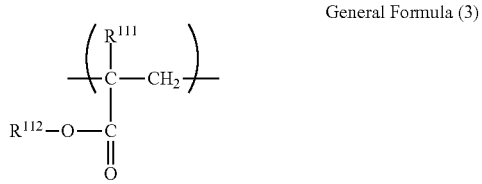
General Formula (3)

(in General Formula (3), $R^{111}$ represents one of a hydrogen atom and a methyl group, and $R^{112}$ represents an alkyl group having 1 or more to 9 or less carbon atoms), in which the polymerizable functional groups that the charge transport compound has are independently selected from an acryloyloxy group and a methacryloyloxy group, and a content of the compound represented by General Formula (1) in the composition is 0.10% by mass or more.

As a result of conducting an intensive examination, the inventors of the present invention have found that in order to obtain an electrophotographic photoreceptor which is excellent in abrasion resistance and scratch resistance, has excellent electrical characteristics, and inhibits an image defect, the following points are important.

A surface layer obtained by incorporating resin particles containing fluorine atoms and a dispersant into a curable resin has higher abrasion resistance due to the curable resin and higher scratch resistance due to the resin particles containing fluorine atoms excellently dispersed in the film. However, an excess of dispersant that does not contribute to the dispersibility of the resin particles containing fluorine atoms tends to remain in a portion of the film of the surface layer. By freely moving in the film of the surface layer, the excess of dispersant tends to be aggregated in the film or in the vicinity of the surface. Presumably, as a result, the dispersant may tend to cause problems such as impairing electrical characteristics by locally forming charge trapping sites in the film or causing a cleaning defect by deteriorating surface lubricity in the vicinity of the surface.

In a case where the compound represented by General Formula (1) is additionally copolymerized in the curable resin, a crosslinked network structure in the curable resin is densified, and accordingly, the excess of dispersant is effectively inhibited from freely moving in the film of the surface layer. The inventors of the present invention have found that, as a result, it is possible to provide an electrophotographic photoreceptor which is excellent in abrasion resistance and scratch resistance and has excellent electrical characteristics and excellent surface lubricity.

[Resin Particles Containing Fluorine Atoms]

Examples of the resin particles containing fluorine atoms (fluorine atom-containing resin particles) include polytetrafluoroethylene resin particles, trifluoroethylene resin particles, polytetrafluoroethylene-hexafluoropropylene resin particles, vinyl fluoride resin particles, vinylidene fluoride resin particles, and dichlorodifluoroethylene resin particles. Particles of copolymers of these resins are also included in the examples. Among these, polytetrafluoroethylene resin particles are preferable.

In view of excellent scratch resistance, the average particle diameter of primary particles of the fluorine atom-containing resin particles is preferably 0.4 µm or less.

In the surface layer, the content of the fluorine atom-containing resin particles with respect to the total mass of the surface layer is preferably 4.0% by mass or more to 40.0% by mass or less.

[Charge Transport Compound]

Examples of the charge transport compound having 2 or more polymerizable functional groups include a triarylamine compound and a hydrazone compound.

As the charge transport compound, for example, a charge transport compound represented by General Formula (4) or General Formula (5) is preferable.

General Formula (4)

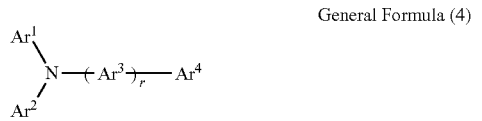

In General Formula (4), $Ar^1$, $Ar^2$, and $Ar^4$ each independently represent one of a monovalent group represented by Formula (M1) and a substituted or unsubstituted aryl group. $Ar^3$ represents one of a divalent group represented by Formula (M2) and a substituted or unsubstituted arylene group. Here, at least two among $Ar^1$ to $Ar^2$ each represent one of a monovalent group represented by Formula (M1) and a divalent group represented by Formula (M2). r is one of 0 and 1.

Formula (M1)

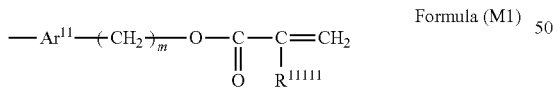

In Formula (M1), $R^{11111}$ represents one of a hydrogen atom and a methyl group. $Ar^{11}$ represents a substituted or unsubstituted arylene group. m is an integer of 1 or greater.

Formula (M2)

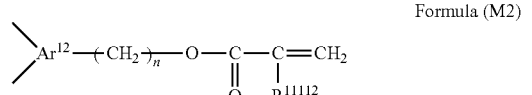

In Formula (M2), $R^{11112}$ represents one of a hydrogen atom and a methyl group. $Ar^{12}$ represents a substituted or unsubstituted trivalent aromatic hydrocarbon group. n is an integer of 1 or greater.

General Formula (5)

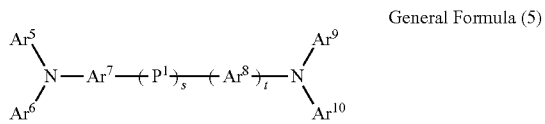

In General Formula (5), $Ar^5$, $Ar^6$, $Ar^9$, and $Ar^{10}$ each independently represent one of a monovalent group represented by Formula (M1) and a substituted or unsubstituted aryl group. $Ar^7$ and $Ar^8$ each independently represent one of a divalent group represented by Formula (M2) and a substituted or unsubstituted arylene group. Here, at least two among $Ar^5$ to $Ar^{10}$ each represent one of a monovalent group represented by Formula (M1) and a divalent group represented by Formula (M2). $P^1$ represents one of an oxygen atom, a cycloalkylidene group, a divalent group including 2 phenylene groups bonded to each other through an oxygen atom, and an ethylene group. s and t each independently represent one of 0 and 1.

Formula (M1)

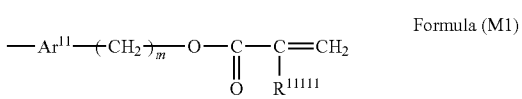

In Formula (M1), $R^{11111}$ represents one of a hydrogen atom and a methyl group. $Ar^{11}$ represents a substituted or unsubstituted arylene group. m represents an integer of 1 or greater.

Formula (M2)

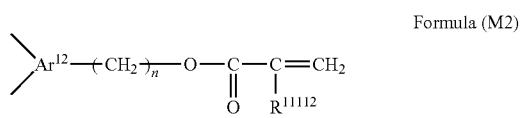

In Formula (M2), $R^{11112}$ represents one of a hydrogen atom and a methyl group. $Ar^{12}$ represents a substituted or unsubstituted trivalent aromatic hydrocarbon group. n represents an integer of 1 or greater.

In view of excellent electrical characteristics, a charge transport compound represented by General Formula (4) is more preferable.

<Specific Examples of Charge Transport Compound>

Specific examples of the charge transport compound include example compounds (C-1) to (C-20) shown below. However, the present disclosure is not limited thereto. A plurality of kinds of these compounds may be used.

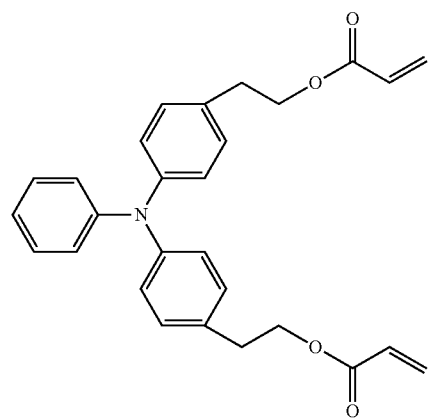
(C-1)
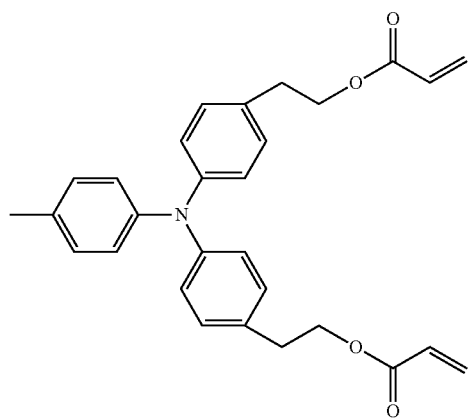
(C-2)
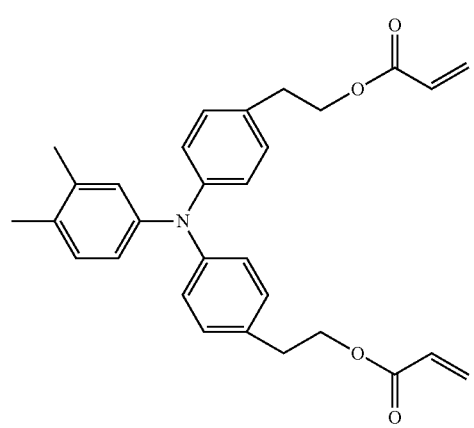
(C-3)
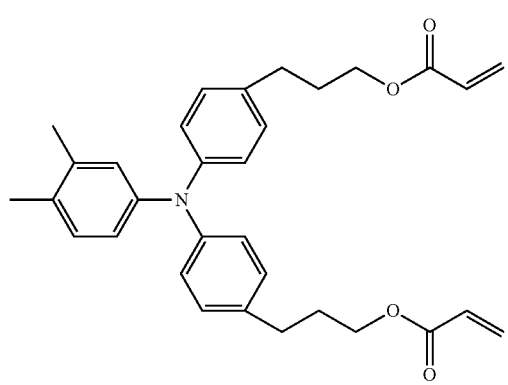
(C-4)
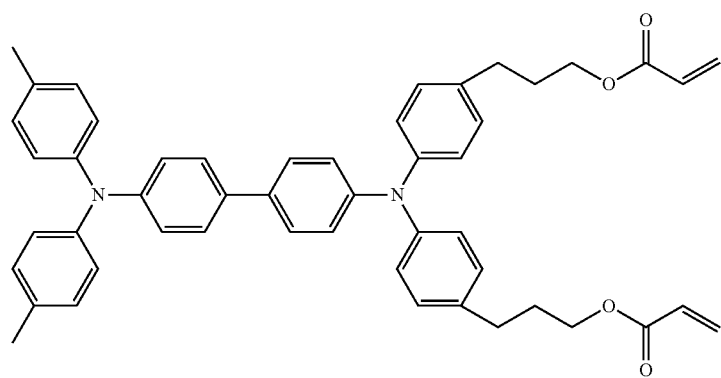
(C-5)
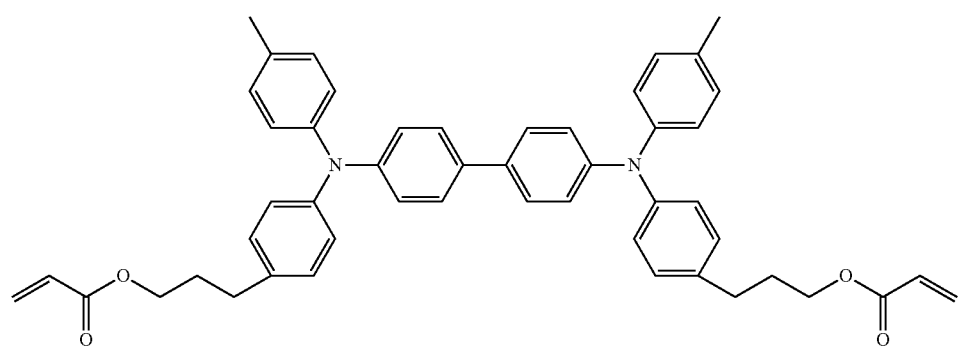
(C-6)

-continued
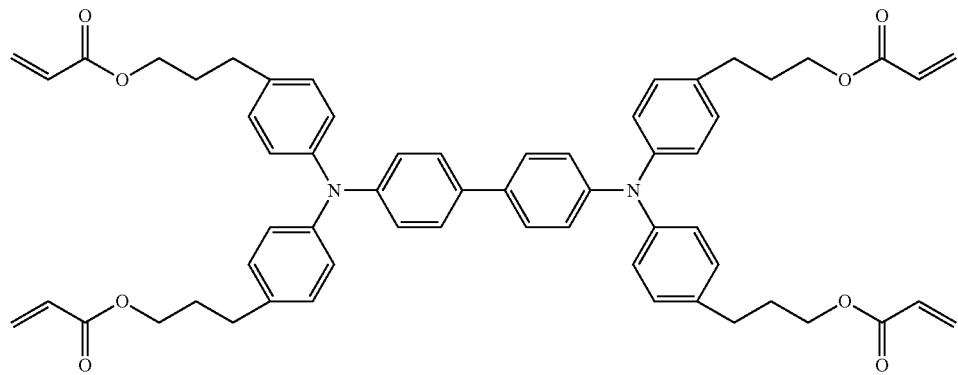
(C-7)
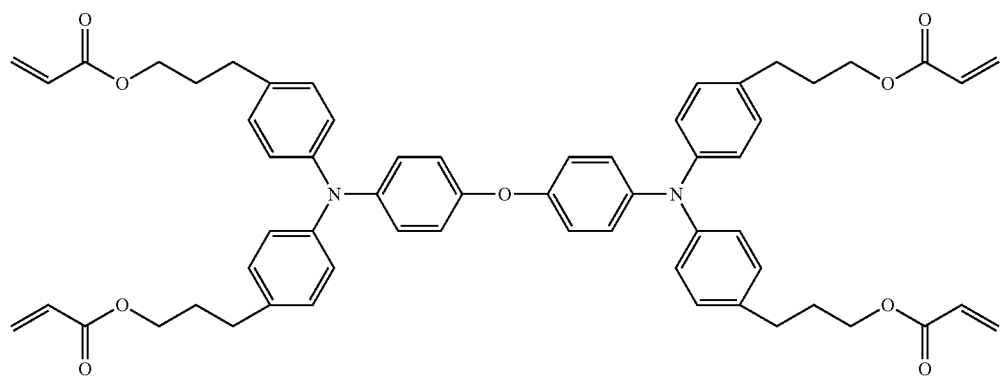
(C-8)
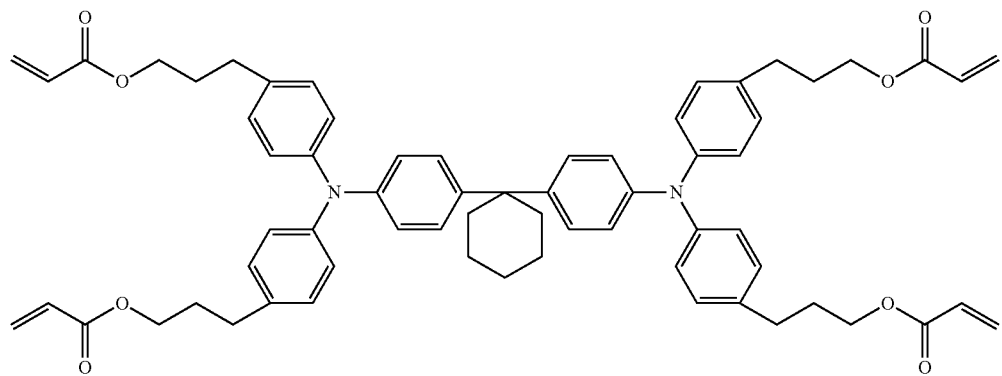
(C-9)
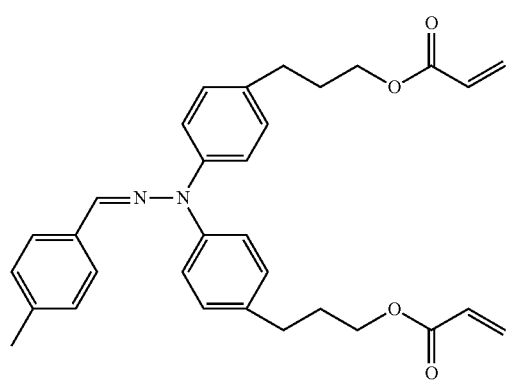
(C-10)
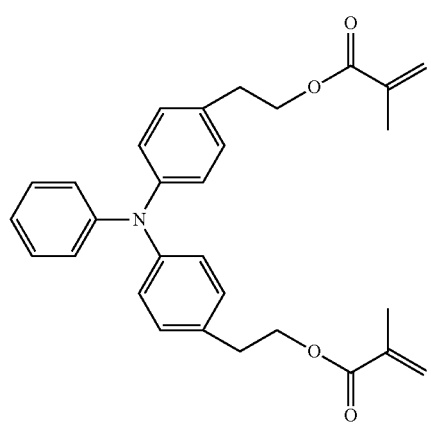
(C-11)

-continued
(C-12)
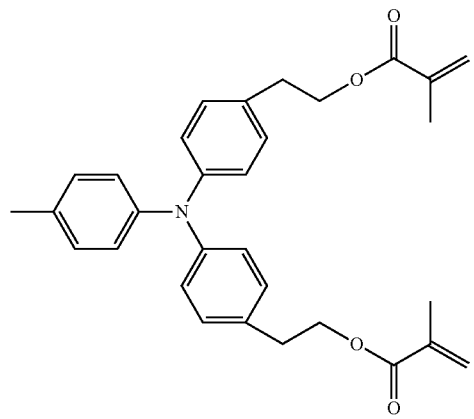
(C-13)
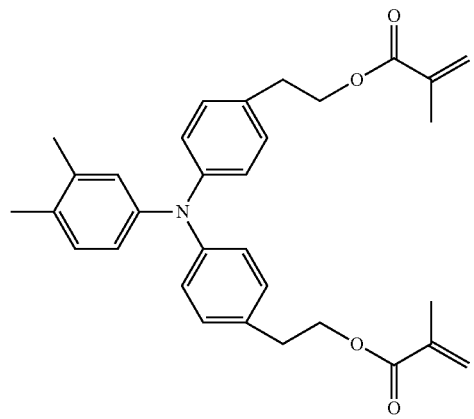
(C-14)
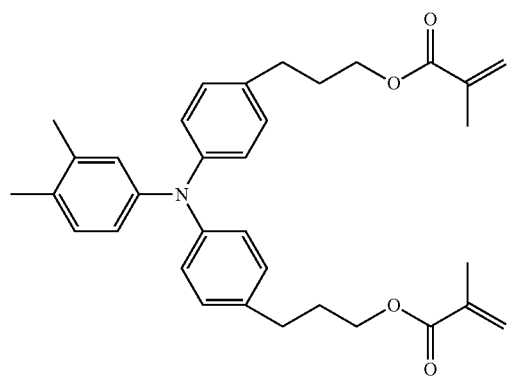
(C-15)
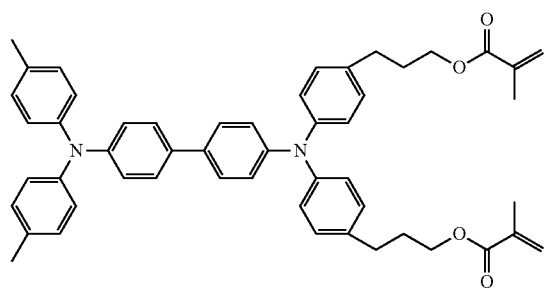
(C-16)
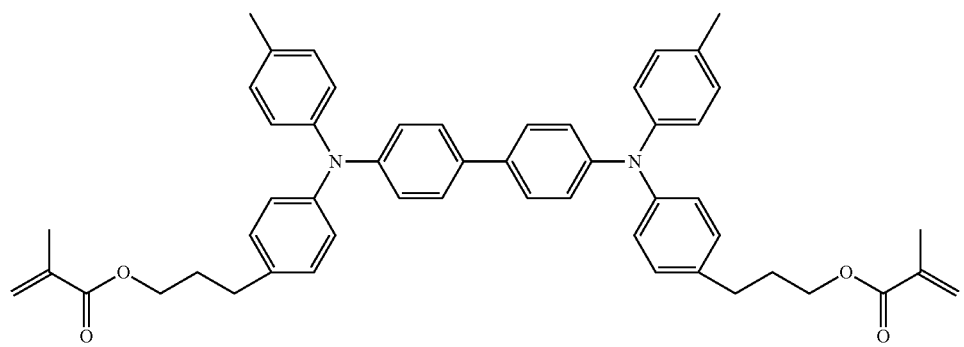
(C-17)
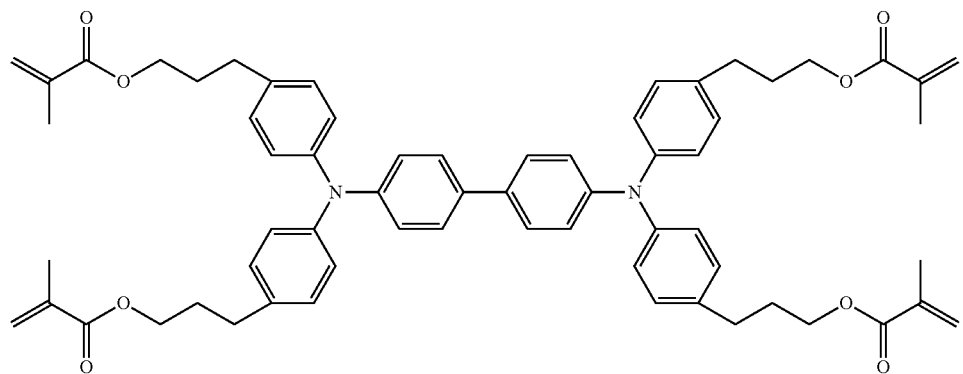

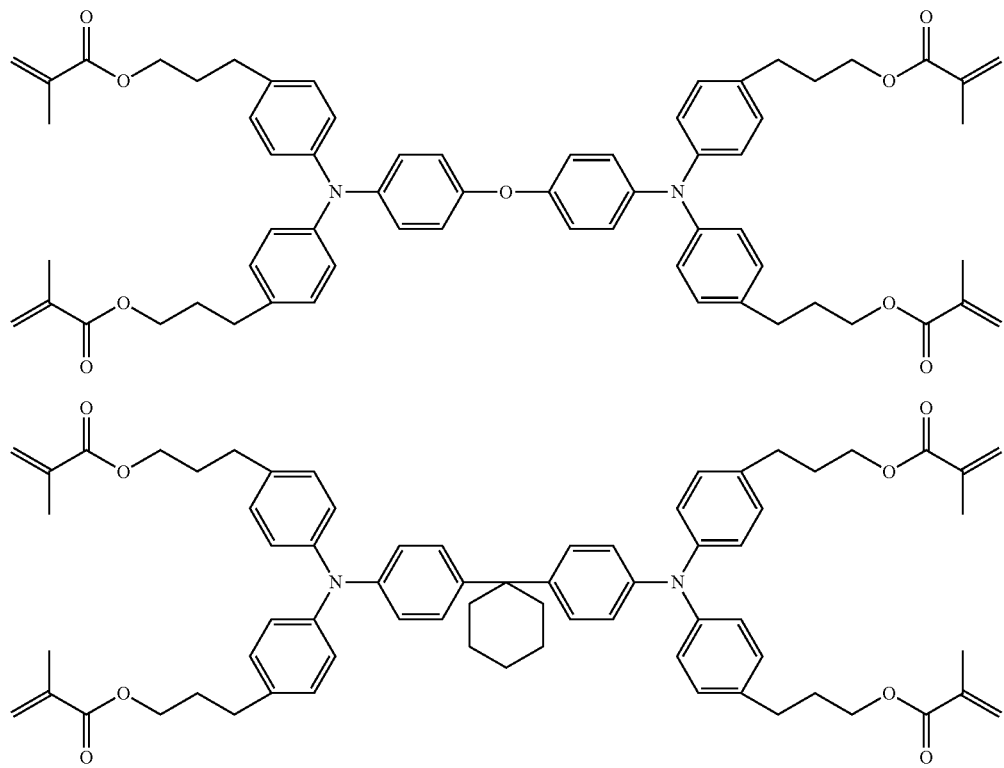

(C-18)

(C-19)

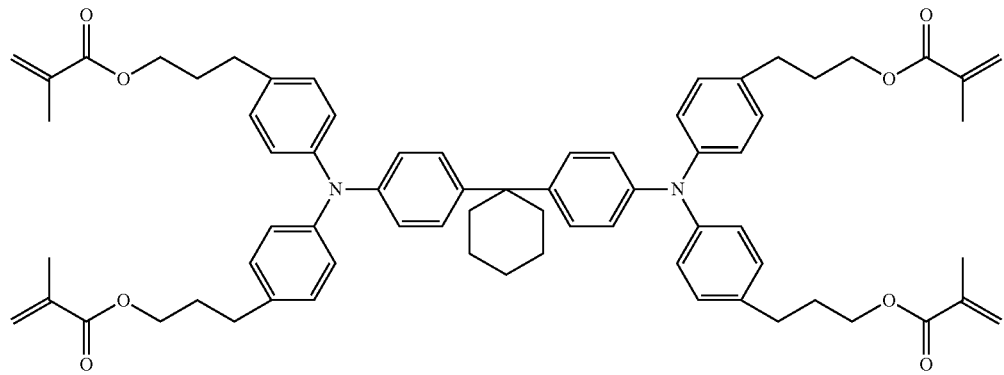

(C-20)

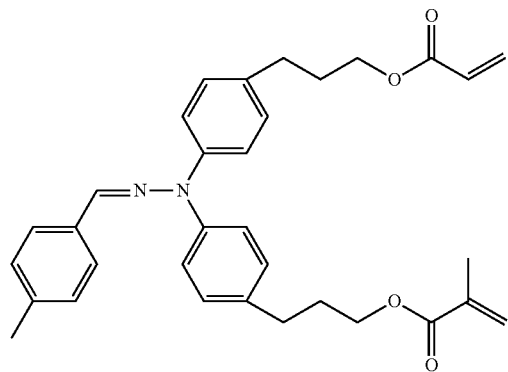

In view of excellent electrical characteristics, the content of the charge transport compound in the aforementioned composition is preferably 58.0% by mass or more to 99.0% by mass or less.

[Compound Represented by General Formula (1)]

The compound represented by General Formula (1) will be described. In General Formula (1), $R^1$ represents one of a hydrogen atom and a methyl group, and $R^2$ represents an alkyl group having 3 or more to 6 or less carbon atoms. In the present disclosure, specific examples of the compound represented by General Formula (1) include example compounds (A-1) to (A-48) shown below, but the present disclosure is not limited thereto. A plurality of kinds of these compounds may be used. Among the compounds represented by General Formula (1), in view of strong effect, the number of carbon atoms in $R^2$ is preferably 3. One of the example compound (A-1) and the example compound (A-25) is more preferable.

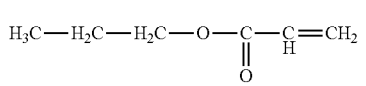

(A-1)

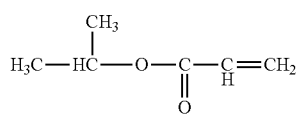

(A-2)

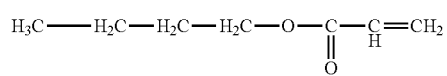

(A-3)

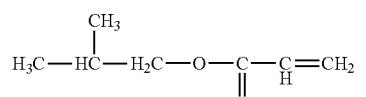

(A-4)

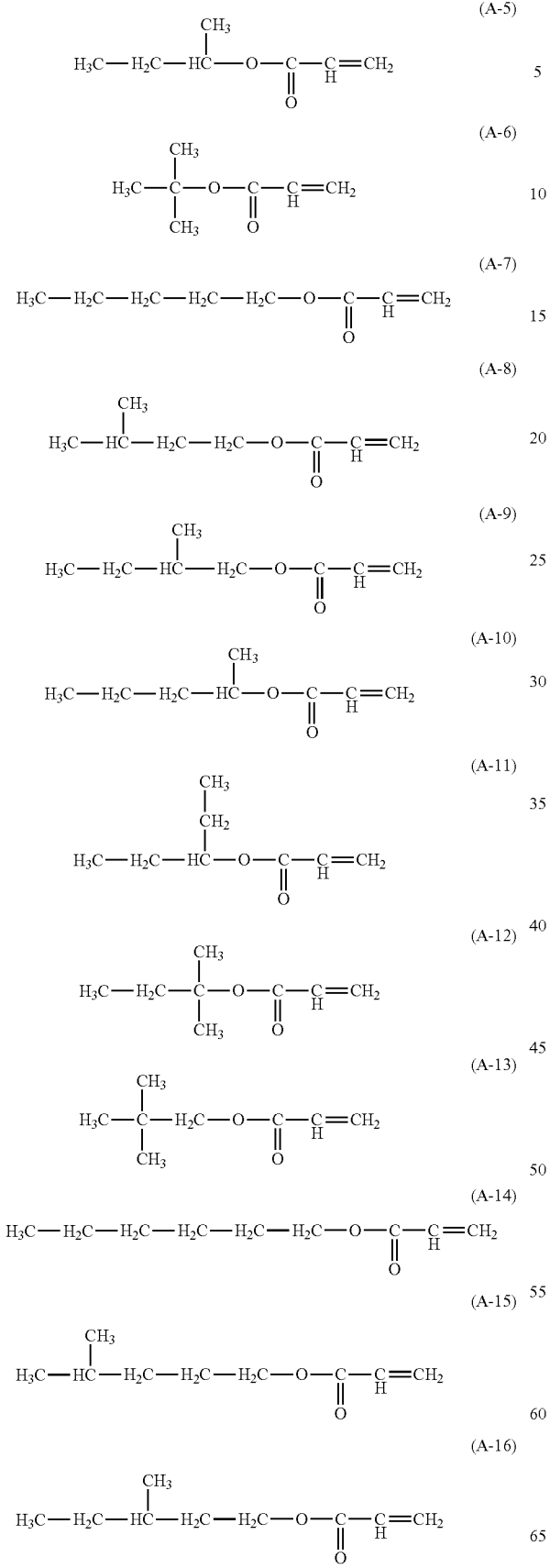
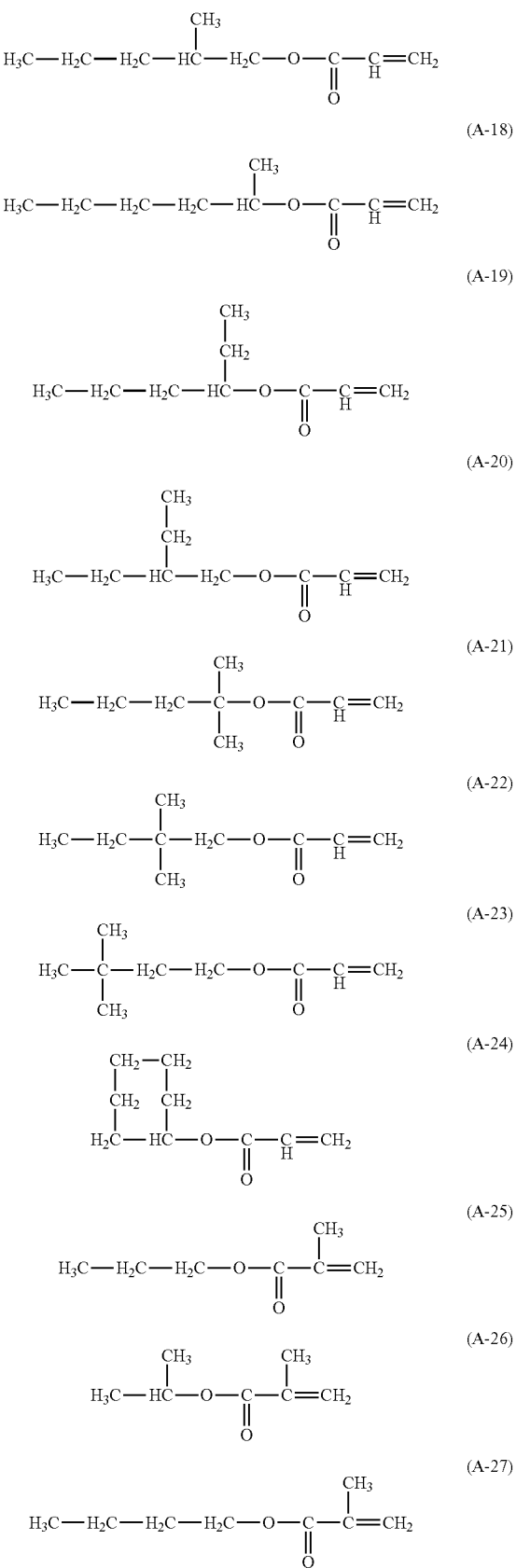

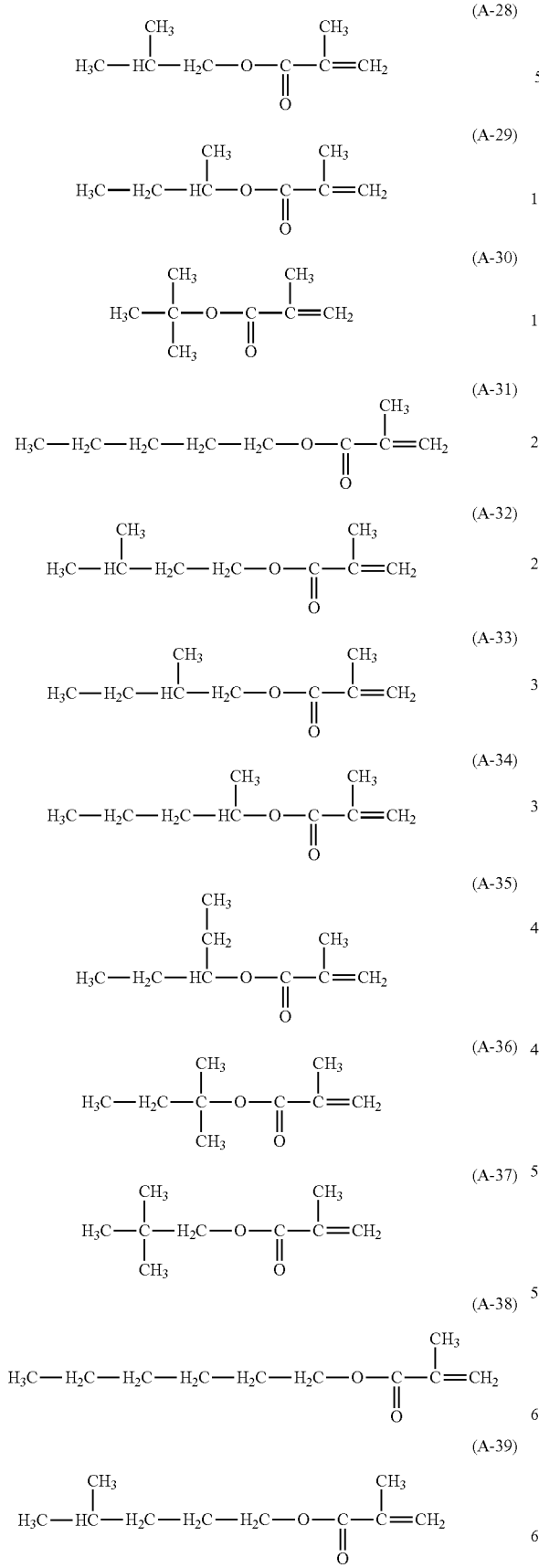
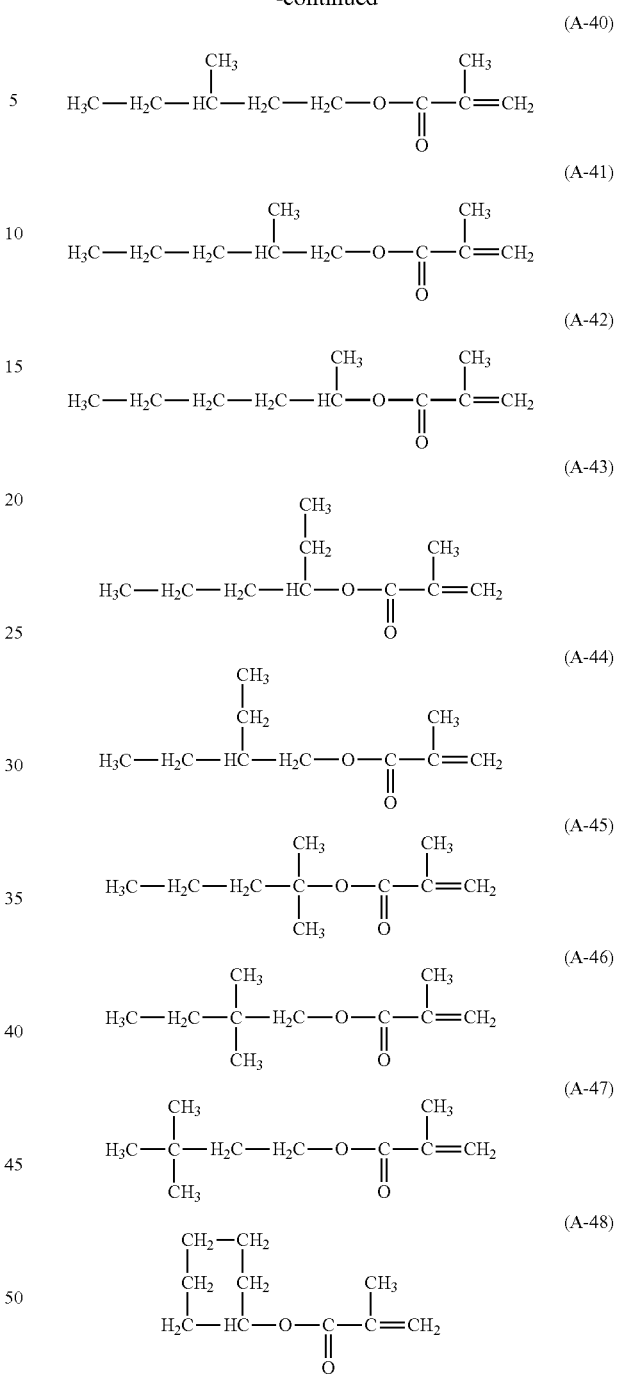

In view of fully obtaining effects, the content of the compound represented by General Formula (i) in the aforementioned composition is 0.10% by mass or more. In a case where the content is less than 0.10% by mass, sometimes one of the electrical characteristics and the surface lubricity is not fully satisfied. In view of fully obtaining effects, the content of the compound represented by General Formula (1) in the composition is more preferably 0.10% by mass or more to 10.0% by mass or less.

[Resin Having Structure Represented by General Formula (2) and Structure Represented by General Formula (3)]

The resin having a structure represented by General Formula (2) and a structure represented by General Formula (3) will be described. In General Formula (2), $R^{11}$ represents one of a hydrogen atom and a methyl group, $R^{12}$ represents an alkylene group having 1 or more to 4 or less carbon atoms, and a is any integer among 3 to 5. In the present disclosure, specific examples of compounds of monomers as raw materials of the resin represented by General Formula (2) include example compounds (F-1) to (F-16), but the present disclosure is not limited thereto.

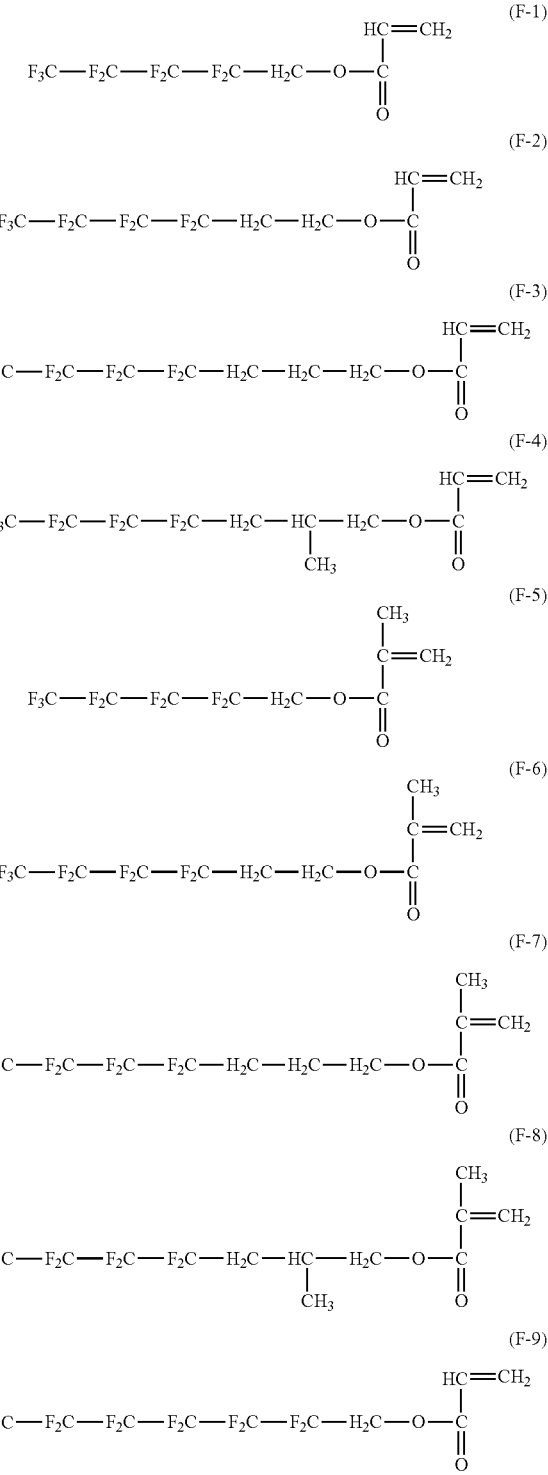
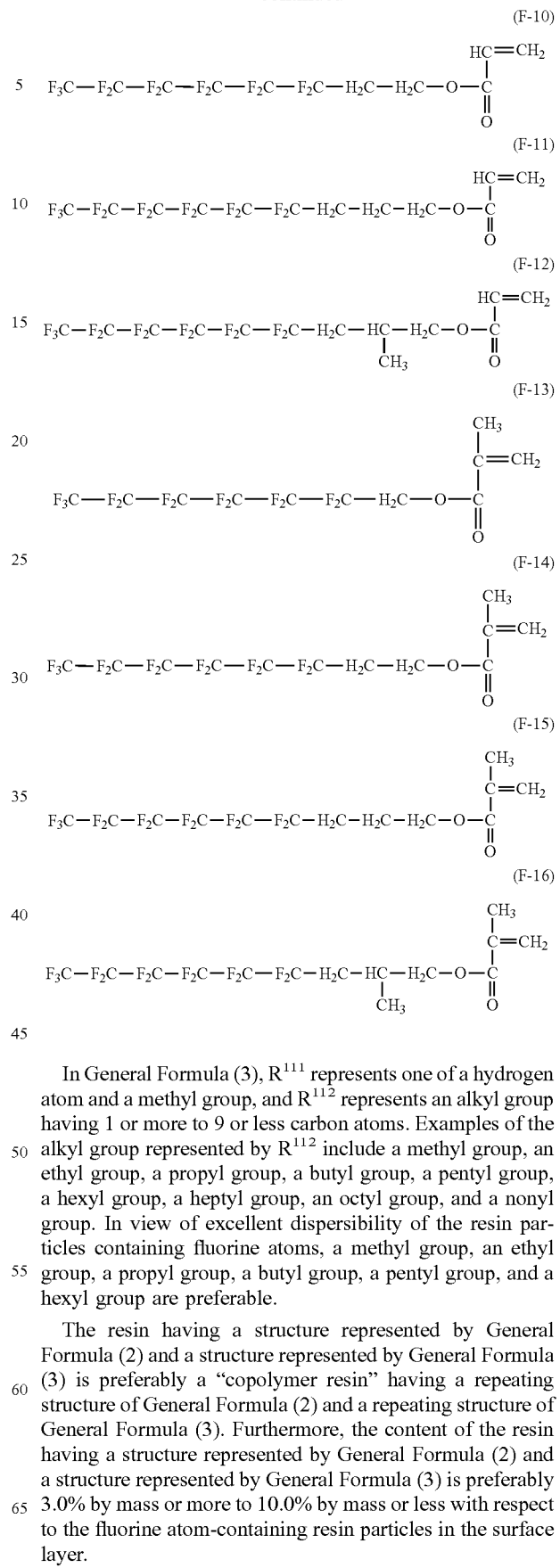

In General Formula (3), $R^{111}$ represents one of a hydrogen atom and a methyl group, and $R^{112}$ represents an alkyl group having 1 or more to 9 or less carbon atoms. Examples of the alkyl group represented by $R^{112}$ include a methyl group, an ethyl group, a propyl group, a butyl group, a pentyl group, a hexyl group, a heptyl group, an octyl group, and a nonyl group. In view of excellent dispersibility of the resin particles containing fluorine atoms, a methyl group, an ethyl group, a propyl group, a butyl group, a pentyl group, and a hexyl group are preferable.

The resin having a structure represented by General Formula (2) and a structure represented by General Formula (3) is preferably a "copolymer resin" having a repeating structure of General Formula (2) and a repeating structure of General Formula (3). Furthermore, the content of the resin having a structure represented by General Formula (2) and a structure represented by General Formula (3) is preferably 3.0% by mass or more to 10.0% by mass or less with respect to the fluorine atom-containing resin particles in the surface layer.

[Compound Represented by General Formula (6)]

In view of further improving effects, it is preferable that the composition further contains a compound represented by General Formula (6).

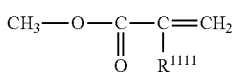

General Formula (6)

In General Formula (6), $R^{1111}$ represents one of a hydrogen atom and a methyl group.

In view of further improving surface lubricity, it is preferable that the composition further contains a siloxane-modified acryl resin.

[Electrophotographic Photoreceptor]

Next, the configuration of the electrophotographic photoreceptor according to an aspect of the present disclosure will be described. FIG. 1A to FIG. 1D are views illustrating an example of layer configuration of the electrophotographic photoreceptor according to an embodiment of the present disclosure.

Figure 1B:
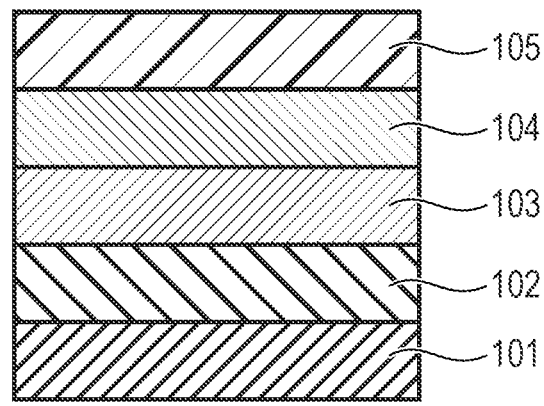
FIG. 1B is a view illustrating an example of layer configuration of the electrophotographic photoreceptor according to an embodiment of the present disclosure.

FIG. 1A illustrates, as an example of the electrophotographic photoreceptor according to the present embodiment, an electrophotographic photoreceptor having a support 101, a photosensitive layer 104, and a cured surface layer (surface layer) 105 in this order. As illustrated in FIG. 1B, the electrophotographic photoreceptor according to the present embodiment may have one of an electro-conductive layer 102 and an under coating layer 103 between the support 101 and the photosensitive layer 104.

Each of the layers is formed, for example, by a method of preparing a coating liquid for each layer that will be described later, performing coating according to the desired order of layers, and performing drying. At this time, examples of the coating method of the coating liquid include dip coating, spray coating, ink jet coating, roll coating, die coating, blade coating, curtain coating, wire bar coating, and ring coating. Among these, from the viewpoint of efficiency and productivity, dip coating is preferable. Hereinafter, each layer will be described.

<Support>

As illustrated in FIG. 1A, the electrophotographic photoreceptor according to the present embodiment has the support 101. In the present embodiment, the support 101 is preferably an electro-conductive support having electric conductivity. Examples of the shape of the support 101 include a cylindrical shape, a belt shape, and a sheet shape. Among these, a cylindrical support is preferable. Furthermore, the surface of the support 101 may be subjected to an electrochemical treatment such as anodization, a plasma treatment, or a cutting treatment.

As materials of the support, a metal, a resin, glass, and the like are preferable.

Examples of the metal include aluminum, iron, nickel, copper, gold, stainless steel, and an alloy of these. Among these, a support made of aluminum is preferable.

Furthermore, one of the resin and the glass may be subjected to a treatment such as mixing or coating with an electro-conductive material such that electric conductivity is imparted thereto.

<Electro-Conductive Layer>

As illustrated in FIG. 1B, in the electrophotographic photoreceptor according to the present embodiment, the electro-conductive layer 102 may be provided on the support 101. In a case where the electro-conductive layer 102 is provided, it is possible to conceal one of the scratches and the asperities on the surface of the support 101, or to inhibit the light reflection on the surface of the support 101.

It is preferable that the electro-conductive layer contains electro-conductive particles and a resin.

Examples of materials of the electro-conductive particles include a metal oxide, a metal, and carbon black. Examples of the metal oxide include zinc oxide, aluminum oxide, indium oxide, silicon oxide, zirconium oxide, tin oxide, titanium oxide, magnesium oxide, antimony oxide, and bismuth oxide. Examples of the metal include aluminum, nickel, iron, chromium, copper, zinc, and silver.

As the electro-conductive particles, among these, a metal oxide is preferably used, and titanium oxide, tin oxide, and zinc oxide are particularly preferably used.

In a case where a metal oxide is used as the electro-conductive particles, the surface of the metal oxide may be treated with a silane coupling agent, and the like, or the metal oxide may be doped with an element such as phosphorus or aluminum or an oxide thereof.

Each of the electro-conductive particles may have a laminated configuration including a core particle and a coating layer that coats the core particle. Examples of the core particle include titanium oxide, barium oxide, and zinc oxide. Examples of the coating layer include a metal oxide such as tin oxide.

In a case where a metal oxide is used as the electro-conductive particles, a volume-average particle diameter thereof is preferably 1 nm or more to 500 nm or less, and more preferably 3 nm or more to 400 nm or less.

Examples of the resin include a polyester resin, a polycarbonate resin, a polyvinyl acetal resin, an acryl resin, a silicone resin, an epoxy resin, a melamine resin, a polyurethane resin, a phenol resin, and an alkyd resin.

The electro-conductive layer may additionally contain silicone oil, resin particles, a concealing agent such as titanium oxide, and the like.

The average film thickness of the electro-conductive layer is preferably 1 μm or more to 50 μm or less, and particularly preferably 3 μm or more to 40 μm or less.

The electro-conductive layer is capable of being formed by preparing a coating liquid for an electro-conductive layer containing the materials described above and a solvent, forming a coating film of the coating liquid, and drying the coating film. Examples of the solvent used in the coating liquid include an alcohol-based solvent, a sulfoxide-based solvent, a ketone-based solvent, an ether-based solvent, an ester-based solvent, and an aromatic hydrocarbon-based solvent. The electro-conductive particles are capable of being dispersed in the coating liquid for an electro-conductive layer, for example, by a method using a paint shaker, a sand mill, a ball mill, or a liquid collision-type high-speed disperser.

<Under Coating Layer>

As illustrated in FIG. 1B, in the electrophotographic photoreceptor according to the present embodiment, the under coating layer 103 may be provided on one of the support 101 and the electro-conductive layer 102. In a case where the under coating layer 103 is provided, interlayer adhesiveness is improved, and a charge injection inhibitory function can be imparted.

It is preferable that the under coating layer contains a resin. Furthermore, the under coating layer may be formed as a cured film by polymerizing a composition containing a monomer having a polymerizable functional group.

Examples of the resin include a polyester resin, a polycarbonate resin, a polyvinyl acetal resin, an acryl resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group that the monomer having a polymerizable functional group has include an isocyanate group, a blocked isocyanate group, a methylol group, an alkylated methylol group, an epoxy group, a metal alkoxide group, a hydroxyl group, an amino group, a carboxyl group, a thiol group, a carboxylic anhydride group, and a carbon-carbon double bond group.

For the purpose of improving electrical characteristics, the under coating layer may additionally contain an electron transport substance, a metal oxide, a metal, an electroconductive polymer, and the like. Among these, an electron transport substance and a metal oxide are preferably used.

Examples of the electron transport substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. By using an electron transport substance containing a polymerizable functional group as the electron transport substance and copolymerizing the electron transport substance with the aforementioned monomer having a polymerizable functional group, the under coating layer may be formed as a cured film.

Examples of the metal oxide include indium tin oxide, tin oxide, indium oxide, titanium oxide, zinc oxide, aluminum oxide, and silicon dioxide. Examples of the metal include gold, silver, and aluminum.

The under coating layer may additionally contain additives.

The average film thickness of the under coating layer is preferably 0.1 µm or more to 50 µm or less, more preferably 0.2 µm or more to 40 µm or less, and particularly preferably 0.3 µm or more to 30 µm or less.

The under coating layer is capable of being formed by preparing a coating liquid for an under coating layer containing the materials described above and a solvent, forming a coating film of the coating liquid, and drying and/or curing the coating film. Examples of the solvent used in the coating liquid include an alcohol-based solvent, a ketone-based solvent, an ether-based solvent, an ester-based solvent, and an aromatic hydrocarbon-based solvent.

<Photosensitive Layer>

The photosensitive layer of the electrophotographic photoreceptor according to the present embodiment is mainly classified into (1) laminated photosensitive layer and (2) single-layered photosensitive layer. From the viewpoint of electrophotographic characteristics, a laminated photosensitive layer is preferable.

Figure 1C:
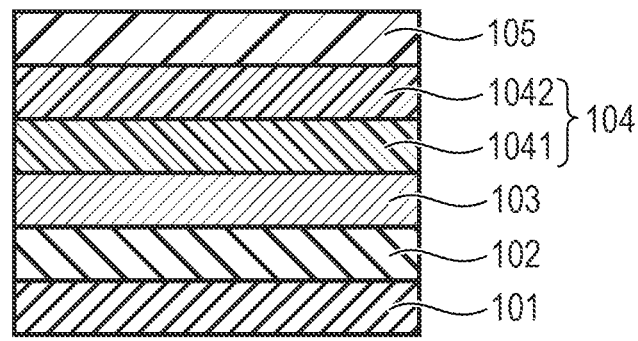
FIG. 1C is a view illustrating an example of layer configuration of the electrophotographic photoreceptor according to an embodiment of the present disclosure.
Figure 1D:
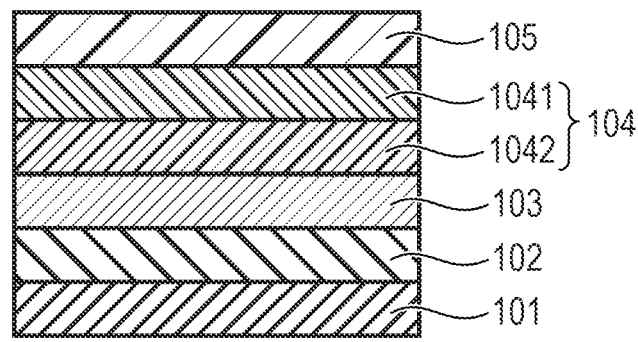
FIG. 1D is a view illustrating an example of layer configuration of the electrophotographic photoreceptor according to an embodiment of the present disclosure.

As illustrated in FIG. 1C and FIG. 1D, (1) laminated photosensitive layer is a laminated photosensitive layer 104 having a charge generating layer 1041 containing a charge generating substance and a charge transport layer 1042 containing a charge transport compound. As illustrated in FIG. 1C, the laminated photosensitive layer includes a regular layer-type photosensitive layer in which the charge generating layer 1041 and the charge transport layer 1042 are laminated in this order from the support 101 side and, as illustrated in FIG. 1D, a reverse layer-type photosensitive layer in which the charge transport layer 1042 and the charge generating layer 1041 are laminated in this order from the support 101 side. From the viewpoint of electrophotographic characteristics, the regular layer-type photosensitive layer is preferable. As illustrated in FIG. 1A and FIG. 1B, (2) single-layered photosensitive layer is a single-layered photosensitive layer containing both the charge generating substance and charge transport compound in the same layer.

(1) Laminated Photosensitive Layer

As described above, the laminated photosensitive layer has a charge generating layer and a charge transport layer.

(1-1) Charge Generating Layer

It is preferable that the charge generating layer contains a charge generating substance and a resin.

Examples of the charge generating substance include an azo pigment, a perylene pigment, a polycyclic quinone pigment, an indigo pigment, and a phthalocyanine pigment. Among these, an azo pigment and a phthalocyanine pigment are preferable. Among phthalocyanine pigments, an oxytitanium phthalocyanine pigment, a chlorogallium phthalocyanine pigment, and a hydroxygallium phthalocyanine pigment are preferable.

The content of the charge generating substance in the charge generating layer with respect to the total mass of the charge generating layer is preferably 40% by mass or more to 85% by mass or less, and more preferably 60% by mass or more to 80% by mass or less.

Examples of the resin include a polyester resin, a polycarbonate resin, a polyvinyl acetal resin, a polyvinyl butyral resin, an acryl resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Among these, a polyvinyl butyral resin is more preferable.

The charge generating layer may additionally contain additives such as an antioxidant and an ultraviolet absorber. Specifically, examples of the additives include a hindered phenol compound, a hindered amine compound, a sulfur compound, a phosphorus compound, and a benzophenone compound.

The average film thickness of the charge generating layer is preferably 0.1 µm or more to 1 µm or less, and more preferably 0.15 µm or more to 0.4 µm or less.

The charge generating layer is capable of being formed by preparing a coating liquid for a charge generating layer containing the materials described above and a solvent, forming a coating film of the coating liquid for a charge generating layer, and drying the coating film. Examples of the solvent used in the coating liquid for a charge generating layer include an alcohol-based solvent, a sulfoxide-based solvent, a ketone-based solvent, an ether-based solvent, an ester-based solvent, and an aromatic hydrocarbon-based solvent.

(1-2) Charge Transport Layer

It is preferable that the charge transport layer contains a charge transport compound and a resin.

Examples of the charge transport compound include a polycyclic aromatic compound, a heterocyclic compound, a hydrazone compound, a styryl compound, an enamine compound, a benzidine compound, a triaryl amine compound, and a resin having a group derived from these substances. Among these, a triaryl amine compound and a benzidine compound are preferable.

The content of the charge transport compound in the charge transport layer with respect to the total mass of the charge transport layer is preferably 25% by mass or more to 70% by mass or less, and more preferably 30% by mass or more to 55% by mass or less.

Examples of the resin include a polyester resin, a polycarbonate resin, an acryl resin, and a polystyrene resin. Among these, a polycarbonate resin and a polyester resin are preferable. As the polyester resin, a polyarylene resin is particularly preferable.

The content ratio (mass ratio) between the charge transport compound and the resin is preferably 4:10 to 20:10, and more preferably 5:10 to 12:10.

The charge transport layer may contain additives such as an antioxidant, an ultraviolet absorber, a plasticizer, a leveling agent, a lubricating agent, and an abrasion resistance enhancer. Specifically, examples of the additives include a hindered phenol compound, a hindered amine compound, a sulfur compound, a phosphorus compound, a benzophenone compound, a siloxane-modified resin, silicone oil, fluororesin particles, polystyrene resin particles, polyethylene resin particles, silica particles, alumina particles, and boron nitride particles.

The average film thickness of the charge transport layer is preferably 5 µm or more to 50 µm or less, more preferably 8 µm or more to 40 µm or less, and particularly preferably 10 µm or more to 30 µm or less.

The charge transport layer is capable of being formed by preparing a coating liquid for a charge transport layer containing the materials described above and a solvent, forming a coating film of the coating liquid for a charge transport layer, and drying the coating film. Examples of the solvent used in the coating liquid include an alcohol-based solvent, a ketone-based solvent, an ether-based solvent, an ester-based solvent, and an aromatic hydrocarbon-based solvent. Among these solvents, an ether-based solvent and an aromatic hydrocarbon-based solvent are preferable.

(2) Single-Layered Photosensitive Layer

As described above, the single-layered photosensitive layer contains both the charge generating substance and charge transport compound. The single-layered photosensitive layer is capable of being formed by preparing a coating liquid for a photosensitive layer containing a charge generating substance, a charge transport compound, a resin, and a solvent, forming a coating film of the coating liquid for a photosensitive layer, and drying the coating film. As the charge generating substance, the charge transport compound, and the resin, the materials exemplified in "(1) Laminated photosensitive layer" are used.

<Surface Layer>

As described above, the surface layer of the electrophotographic photoreceptor according to the present embodiment contains a copolymer of a composition which contains a charge transport compound having 2 or more polymerizable functional groups, a compound represented by General Formula (1), resin particles containing fluorine atoms, and a resin having a structure represented by General Formula (2) and a structure represented by General Formula (3). The polymerizable functional groups that the charge transport compound has are selected from an acryloyloxy group and a methacryloyloxy group. In the composition, the content of the compound represented by General Formula (1) is 0.10% by mass or more.

The surface layer may be prepared by forming a curable resin by polymerizing a composition containing a monomer having a polymerizable functional group. Examples of reactions performed at this time include a thermal polymerization reaction, a photopolymerization reaction, and a radiation polymerization reaction. Examples of the polymerizable functional group that the monomer having a polymerizable functional group has include an acryloyloxy group and a methacryloyloxy group. As the monomer having a polymerizable functional group, a material having a charge transport ability may be used.

The surface layer may contain additives such as an antioxidant, an ultraviolet absorber, a plasticizer, a leveling agent, a lubricating agent, and an abrasion resistance enhancer. Specifically, examples of the additives include a hindered phenol compound, a hindered amine compound, a sulfur compound, a phosphorus compound, a benzophenone compound, a siloxane-modified resin, silicone oil, fluororesin particles, polystyrene resin particles, polyethylene resin particles, silica particles, alumina particles, and boron nitride particles.

A charge transport compound is capable of being added to the surface layer. Examples of the charge transport compound include a triaryl amine compound, a hydrazone compound, a stilbene compound, a pyrazoline compound, an oxazole compound, a thiazole compound, and a triarylmethane compound.

The average film thickness of the surface layer is preferably 0.5 µm or more to 10 µm or less, and more preferably 1 µm or more to 7 µm or less.

The surface layer is capable of being formed by preparing a coating liquid for a surface layer containing the materials described above and a solvent, forming a coating film of the coating liquid, and drying and/or curing the coating film. Examples of the solvent used in the coating liquid include an alcohol-based solvent, a ketone-based solvent, an ether-based solvent, a sulfoxide-based solvent, an ester-based solvent, an aliphatic halogenated hydrocarbon-based solvent, and an aromatic hydrocarbon-based solvent. Among these, an alcohol-based solvent is preferable because this solvent does not dissolve the charge transport layer under the surface layer.

The coating film of the coating liquid for a surface layer is cured, for example, by a curing method using heat, ultraviolet rays, and/or electron beams. In order to improve the hardness of the surface layer of the electrophotographic photoreceptor and to improve the durability of the electrophotographic photoreceptor, it is preferable to cure the coating film by using ultraviolet rays or electron beams.

In a case where electron beam irradiation is performed, as an accelerator, for example, a scanning type, an electrocurtain type, a broad beam type, a pulse type, or a laminar type accelerator is used. The acceleration voltage of electron beams is preferably 120 kV or less, because then it is possible to inhibit electron beams from deteriorating the characteristics of materials without impairing the polymerization efficiency. The electron beam absorbed dose on the surface of the coating film of the coating liquid for a surface layer is preferably 5 kGy or more to 50 kGy or less, and more preferably 1 kGy or more to 10 kGy or less.

In a case where the composition is cured (polymerized) using electron beams, from the viewpoint of inhibiting oxygen from hindering polymerization, it is preferable that the composition is irradiated with electron beams in an inert gas atmosphere and then heated in the inert gas atmosphere. Examples of the inert gas include nitrogen, argon, and helium.

Furthermore, after the composition is irradiated with ultraviolet rays or electron beams, it is preferable that the electrophotographic photoreceptor is heated at a temperature of 100° C. or higher to 140° C. or less. In a case where the electrophotographic photoreceptor is heated in this way, a surface layer having higher durability and inhibiting an image defect is obtained.

[Surface Processing for Electrophotographic Photoreceptor]

Next, the surface processing for the electrophotographic photoreceptor will be described.

The surface layer may be subjected to surface processing by using a polishing sheet, a shape transfer-type member (mold), glass beads, zirconia beads, and the like. Furthermore, depressions and projections may be formed on the surface by using materials configuring the coating liquid. For the purpose of further stabilizing the behavior of a cleaning unit (cleaning blade) to be brought into contact with the electrophotographic photoreceptor, depressions or projections are capable of being provided on the surface layer of the electrophotographic photoreceptor.

The aforementioned depressions or projections may be formed in the entirety of the surface of the electrophotographic photoreceptor or formed in a portion of the surface of the electrophotographic photoreceptor. In a case where the depressions or projections are formed in a portion of the surface of the electrophotographic photoreceptor, it is preferable that the depressions or projections are formed in at least the entirety of the region brought into contact with the cleaning unit (cleaning blade).

For forming the depressions, by bringing a mold, which has projections corresponding to the depressions, into contact with the surface of the electrophotographic photoreceptor under pressure such that the shapes are transferred, the depressions are capable of being formed on the surface of the electrophotographic photoreceptor.

For forming the projections, by bringing a mold, which has depressions corresponding to the projections, into contact with the surface of the electrophotographic photoreceptor under pressure such that the shapes are transferred, the projections are capable of being formed on the surface of the electrophotographic photoreceptor.

<Method for Forming Depressions on Peripheral Surface of Electrophotographic Photoreceptor>

By bringing a mold, which has projections corresponding to depressions to be formed, into contact with the peripheral surface of the electrophotographic photoreceptor under pressure such that the shapes are transferred, depressions are capable of being formed on the peripheral surface of the electrophotographic photoreceptor.

Figure 3A:
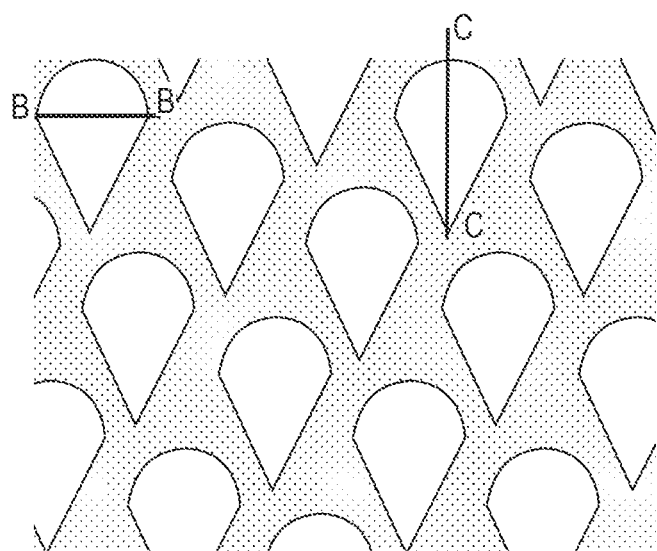
FIG. 3A is a top view illustrating a mold used for surface processing of the electrophotographic photoreceptor.
Figure 3B:
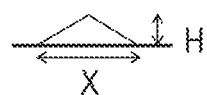
FIG. 3B is a cross-sectional view of a projection in the mold illustrated in FIG. 3A taken along the line B-B.
Figure 3C:
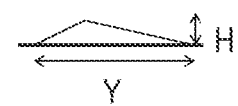
FIG. 3C is a cross-sectional view of a projection in the mold illustrated in FIG. 3A taken along the line C-C.

An example of a mold used for the surface processing for forming depressions on the peripheral surface of the electrophotographic photoreceptor will be described. FIG. 3A to FIG. 3C illustrate an example of a mold used for the surface processing for the electrophotographic photoreceptor. FIG. 3A is a top view schematically illustrating the mold, and FIG. 3B is a schematic cross-sectional view of a projection of the mold taken along the axial direction of the electrophotographic photoreceptor (cross-sectional view taken along the line B-B in FIG. 3A). FIG. 3C is a cross-sectional view of a projection of the mold taken along the circumferential direction of the electrophotographic photoreceptor (cross-sectional view taken along the line C-C in FIG. 3A). The shape of the depressions and the projections of the mold is not particularly limited. For example, the mold is capable of having projections each having a shape with a maximum width X: 10 to 300 μm (in a case where a projection on the mold is seen from above, X means a maximum width of the projection in the axial direction of the electrophotographic photoreceptor; the same is applied to the following description), a maximum length Y: 10 to 300 μm (in a case where a projection on the mold is seen from above, Y means a maximum length of the projection in the circumferential direction of the electrophotographic photoreceptor; the same is applied to the following description), an area ratio: 1% to 80%, and a height H: 0.1 to 10 μm. The area ratio is a proportion of the area of the projections in the total surface area in a case where the mold is seen from above.

Figure 4:
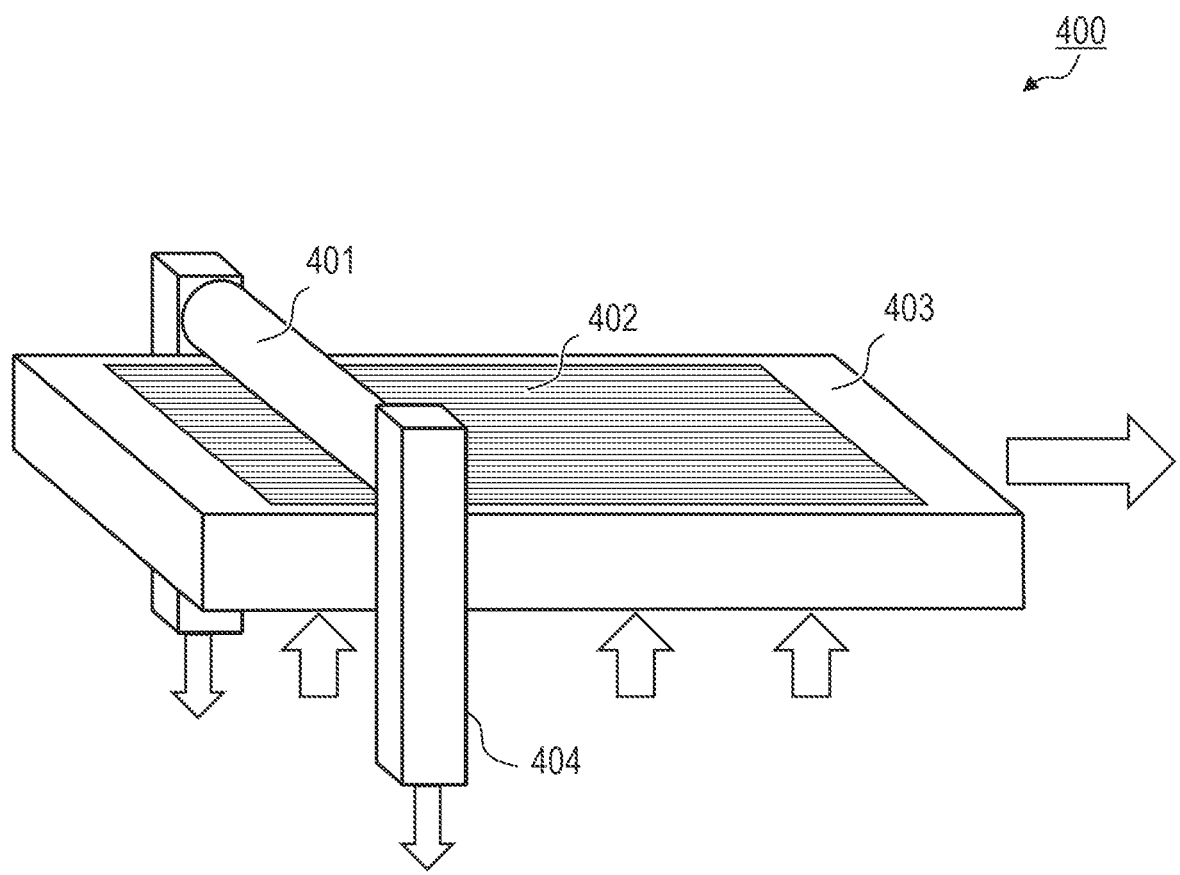
FIG. 4 is a view illustrating an example of a pressure-contact shape transfer processing apparatus for forming depressions on a surface of the electrophotographic photoreceptor.

Next, a pressure-contact shape transfer processing apparatus in which the mold is to be installed will be described. FIG. 4 illustrates an example of a pressure-contact shape transfer processing apparatus for forming depressions on the peripheral surface of the electrophotographic photoreceptor.

With a pressure-contact shape transfer processing apparatus 400 illustrated in FIG. 4, by continuously bringing a mold 402 into contact with the peripheral surface of an electrophotographic photoreceptor 401, which is a substance to be processed, while rotating the electrophotographic photoreceptor 401 and applying pressure thereto, depressions or smooth portions are capable of being formed on the peripheral surface of the electrophotographic photoreceptor 401. The applied pressure is not particularly limited. For example, in a case where the electrophotographic photoreceptor is rotated in the circumferential direction while being pressed on the mold together with a press member under a pressure of 3.0 to 10.0 MPa, depressions are capable of being formed on the entirety of the surface layer (peripheral surface) of the electrophotographic photoreceptor.

Examples of materials of a press member 403 include a metal, a metal oxide, plastic, and glass. Among these, from the viewpoint of mechanical strength, dimensional accuracy, and durability, stainless steel (SUS) is preferable. The mold 402 is installed on the top surface of the press member 403. Furthermore, by a support member (not shown in the drawing) and a press system (not shown in the drawing) installed on the lower surface side thereof, the mold 402 is capable of being brought into contact with the peripheral surface of the electrophotographic photoreceptor 401 supported on a support member 404 under a predetermined pressure. The support member 404 may be pressed on the press member 403 under a predetermined pressure, or the support member 404 and the press member 403 may be pressed on each other.

In the example illustrated in FIG. 4, the press member 403 is moved in a direction perpendicular to the axial direction of the electrophotographic photoreceptor 401 such that the peripheral surface of the electrophotographic photoreceptor 401 is continuously processed while the electrophotographic photoreceptor 401 is being driven or rotating. In a case where the press member 403 is fixed and the support member 404 is moved in a direction perpendicular to the axial direction of the electrophotographic photoreceptor 401, or in a case where both the support member 404 and press member 403 are moved, the peripheral surface of the electrophotographic photoreceptor 401 is capable of being continuously processed as well.

From the viewpoint of efficiently transferring shapes, one of the mold 402 and the electrophotographic photoreceptor 401 is also capable of being heated. The heating temperature is not particularly limited. For example, the temperature of the electrophotographic photoreceptor and the mold is capable of being controlled such that the temperature of the surface of the electrophotographic photoreceptor becomes 30° C. to 200° C.

Examples of the mold 402 include a metal or resin film having undergone a micro-surface processing, a silicon wafer whose surface is patterned using a resist, a resin film containing dispersed fine particles, and a resin film having fine surface shapes and coated with a metal.

From the viewpoint of making the pressure applied to the electrophotographic photoreceptor 401 uniform, an elastic substance is capable of being installed between the mold 402 and the press member 403.

The depressions, the smooth portions, the projections, and the like on the peripheral surface of the electrophotographic photoreceptor is capable of being observed using, for example, microscopes such as a laser microscope, an optical microscope, an electronic microscope, and an atomic force microscope.

<Mechanical Polishing>

For roughening the surface layer of the electrophotographic photoreceptor by polishing, by bringing a polishing tool into contact with the electrophotographic photoreceptor and relatively moving either or both of the electrophotographic photoreceptor and the polishing tool such that the surface of the electrophotographic photoreceptor is polished, the surface layer of the electrophotographic photoreceptor is capable of being roughened. Examples of the polishing tool include a polishing member obtained by providing a layer, which is prepared by dispersing abrasive grains in a binder resin, on a substrate.

For mechanical polishing, known units are capable of being used. Generally, a polishing tool is brought into contact with the electrophotographic photoreceptor, and either or both of the electrophotographic photoreceptor and the polishing tool are relatively moved, whereby the surface of the electrophotographic photoreceptor is polished. The polishing tool is a polishing member obtained by providing layer, which is prepared by dispersing abrasive grains in a binder resin, on a substrate.

Examples of the grains include particles of aluminum oxide, chromium oxide, diamond, iron oxide, cerium oxide, corundum, silica stone, silicon nitride, boron nitride, molybdenum carbide, silicon carbide, tungsten carbide, titanium carbide, and silicon oxide. The particle diameter of the grains is preferably 0.01 µm or more to 50 µm or less. The smaller the particle diameter of the grains, the weaker the polishing force. As a result, it is difficult to increase an F/C ratio of the uppermost surface of the electrophotographic photoreceptor. One kind of the grains may be used singly, or two or more kinds of the grains may be used by being mixed together. In a case where two or more kinds of the grains are mixed together, the materials and the particle diameters thereof may be the same as or different from each other.

As the binder resin in which the grains used in the polishing tool are dispersed, it is possible to use known thermoplastic resins, thermosetting resins, reactive resins, electron beam-curable resins, ultraviolet-curable resins, visible light-curable resins, and antibacterial resins. Examples of the thermoplastic resins include a vinyl chloride resin, a polyamide resin, a polyester resin, a polycarbonate resin, an amino resin, a styrene-butadiene copolymer, a urethane elastomer, and a polyamide silicone resin. Examples of the thermosetting resins include a phenol resin, a phenoxy resin, an epoxy resin, a polyurethane resin, a polyester resin, a silicone resin, a melamine resin, and an alkyd resin. Furthermore, an isocyanate-based curing agent may be added to the thermoplastic resins.

The film thickness of the layer, which is prepared by dispersing the grains in the binder resin, of the polishing tool is, for example, 1 µm or more to 1,000 µm or less. In a case where the film thickness is too large, film thickness unevenness tends to occur, and consequently, surface roughness unevenness of the substance to be polished becomes an issue. In contrast, in a case where the film thickness is too small, the grains tend to be detached.

The shape of the substrate of the polishing tool is not particularly limited. In the present embodiment, in order to efficiently polish the cylindrical electrophotographic photoreceptor, a sheet-like substrate is used, but the substrate may have other shapes (hereinafter, the polishing tool of the present example will be described as a polishing sheet as well). The material of the substrate of the polishing tool is not particularly limited. Examples of materials of the sheet-like substrate include paper, cloth, non-woven cloth, and a plastic film.

The polishing tool can be obtained by coating a substrate with a coating liquid, which is obtained by mixing and dispersing together the grains and the binder resin described above and a solvent capable of dissolving the binder resin, and drying the coating liquid.

<Polishing Apparatus>

An example of a polishing apparatus for polishing the electrophotographic photoreceptor according to present embodiment will be described.

Figure 5:
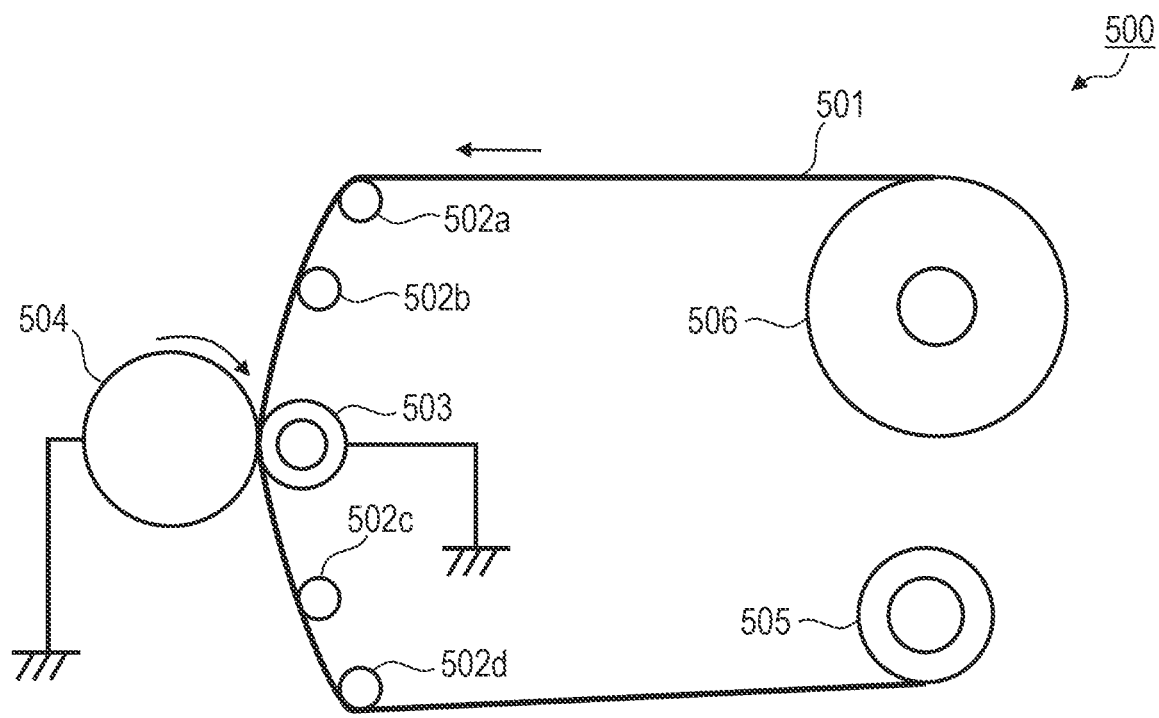
FIG. 5 is a view illustrating an example of a polishing machine using a polishing sheet.

FIG. 5 illustrates an apparatus for polishing a cylindrical electrophotographic photoreceptor by using a polishing sheet.

In FIG. 5, a polishing sheet 501 is wound around a hollow shaft 506, and a motor (not shown in the drawing) is disposed such that tension is applied to the polishing sheet 501 in a direction opposite to the direction along which the polishing sheet 501 is fed to the shaft 506. The polishing sheet 501 is fed in the direction of the arrow and passed through guide rollers 502*a* and 502*b* and backup roller 503. After being used for polishing, the polishing sheet 501 passes through guide rollers 502*c* and 502*d* and is wound around a winding unit 505 by the motor (not shown in the drawing). While the electrophotographic photoreceptor is being polished, the polishing sheet 501 is brought into contact with an object to be treated (electrophotographic photoreceptor not yet being polished) 504 under pressure all the time. In many cases, the polishing sheet 501 has insulating properties. Therefore, it is preferable that one of an earthed material and an electro-conductive material is used in the site that the polishing sheet 501 contacts.

The feeding speed of the polishing sheet 501 is, for example, 10 mm/min or higher to 1,000 mm/min or less. In a case where the feeding amount is small, the binder resin adheres to the surface of the polishing sheet 501, and accordingly, sometimes the surface of the object to be treated 504 is deeply scratched.

The object to be treated 504 is positioned to face the backup roller 503 across the polishing sheet 501. From the viewpoint of improving the uniformity of the surface roughness of the object to be treated 504, an elastic substance may be used in the backup roller 503. At this time, the object to be treated 504 and the backup roller 503 are pressed on each other for a predetermined time at a desired set value across the polishing sheet 501, whereby the surface of the object to be treated 504 is polished. The rotation direction of the object to be treated 504 may be the same as or opposite to the direction along which the polishing sheet 501 is fed. Furthermore, the rotation direction may be changed in the middle of polishing.

The pushing pressure applied to the object to be treated 504 by the backup roller 503 varies with the hardness of the backup roller 503 or the polishing time. For example, the pressure is 0.005 $N/m^2$ or higher or 15 $N/m^2$ or less.

The surface roughness of the electrophotographic photoreceptor is capable of being adjusted by appropriately selecting the feeding speed of the polishing sheet 501, the pushing pressure of the backup roller 503, the type of grains of the polishing sheet, the film thickness of the binder resin of the polishing sheet, the thickness of the substrate, and the like.

[Process Cartridge and Electrophotographic Apparatus]

The process cartridge according to an aspect of the present disclosure supports the aforementioned electrophotographic photoreceptor and at least one unit selected from the group consisting of a charging unit, a developing unit, and a cleaning unit as a whole and is detachably mounted on the body of an electrophotographic apparatus.

The electrophotographic apparatus according to an aspect of the present disclosure has the aforementioned electrophotographic photoreceptor as well as a charging unit, an exposing unit, a developing unit, and a transfer unit.

Figure 2:
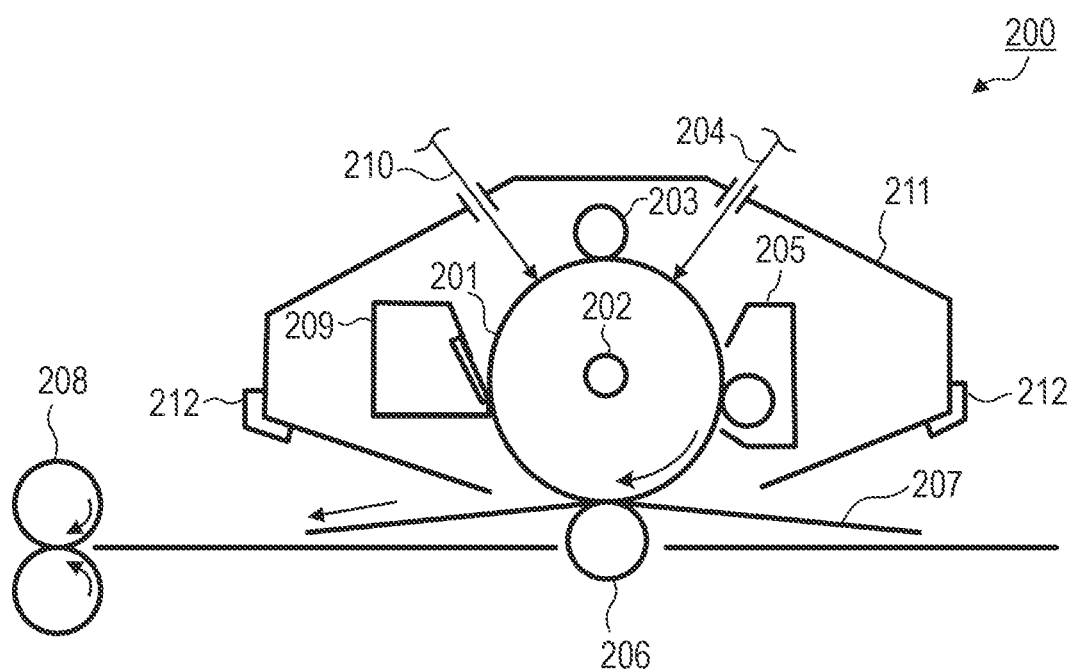
FIG. 2 is a view illustrating an example of an electrophotographic apparatus including a process cartridge having the electrophotographic photoreceptor according to an embodiment of the present disclosure.

FIG. 2 illustrates an example of schematic configuration of an electrophotographic apparatus having a process cartridge including an electrophotographic photoreceptor. As illustrated in FIG. 2, a cylindrical electrophotographic photoreceptor 201 rotates on a shaft 202 in the direction of the arrow at a predetermined circumferential speed. By a charging unit 203, the surface of the electrophotographic photoreceptor 201 is charged with a predetermined potential such as a positive potential or a negative potential. Although FIG. 2 illustrates a roller charging method using a roller-type charging member, charging methods such as a corona charging method, a proximity charging method, and an injection charging method may also be adopted. The roller charging method includes a DC charging method in which only direct current voltage is applied to a roller-type charging member and an AC/DC charging method in which alternating current voltage is overlapped with direct current voltage. From the viewpoint of reducing device costs, downsizing the device, and the like, the DC charging method is preferable. The charged surface of the electrophotographic photoreceptor 201 is irradiated with exposure light 204 from an exposing unit (not shown in the drawing), whereby an electrostatic latent image corresponding to the intended image information is formed. The electrostatic latent image formed on the surface of the electrophotographic photoreceptor 201 is developed by a toner stored in a developing unit 205, whereby a toner image is formed on the surface of the electrophotographic photoreceptor 201. The toner image formed on the surface of the electrophotographic photoreceptor 201 is transferred to a transfer material 207 by a transfer unit 206. The transfer material 207 to which the toner image is transferred is transported to a fixing unit 208, and the toner image is subjected to a fixing treatment and printed out of an electrophotographic apparatus 200. The electrophotographic apparatus 200 may have a cleaning unit 9 for removing attachment such as the toner remaining on the surface of the electrophotographic photoreceptor 201 after transfer. Furthermore, instead of providing an extra cleaning unit, a so-called cleaner-less system for removing the aforementioned attachment by using a developing unit or the like may be used. The electrophotographic apparatus 200 may have an electricity removing mechanism for performing an electricity removing treatment on the surface of the electrophotographic photoreceptor 201 by using pre-exposure light 210 from a pre-exposing unit (not shown in the drawing). Furthermore, in order for a process cartridge 211 of the present disclosure to be mounted on or detached from the body of the electrophotographic apparatus 200, a guiding unit 212 such as a rail may be provided.

The electrophotographic photoreceptor of the present disclosure is capable of being used as a laser beam printer, an LED printer, a copy machine, a fax machine, a composite machine including these, and the like.

According to the present disclosure, it is possible to provide an electrophotographic photoreceptor which includes a support and a photosensitive layer, is excellent in abrasion resistance and scratch resistance, has excellent electrical characteristics, and is capable of inhibiting an image defect, and to provide a manufacturing method thereof. Furthermore, according to the present disclosure, it is possible to provide a process cartridge and an electrophotographic apparatus which have the electrophotographic photoreceptor.

EXAMPLES

Hereinafter, the present disclosure will be more specifically described using examples and comparative examples. As long as the gist of the present disclosure is maintained, the present disclosure is not limited to the following examples. In the following description of examples, unless otherwise specified, "part" is based on mass.

Manufacturing Method of Resin

Manufacturing Example 1

By the method described in "Synthesis Example (E-3)" in Japanese Patent No. 4436456, a product containing a compound represented by an example compound (F-10) as a main component was obtained.

Then, by the method described in "Manufacturing Example (E-1)" in Japanese Patent No. 4436456, a compound represented by Formula (7) was obtained.

Formula (7)

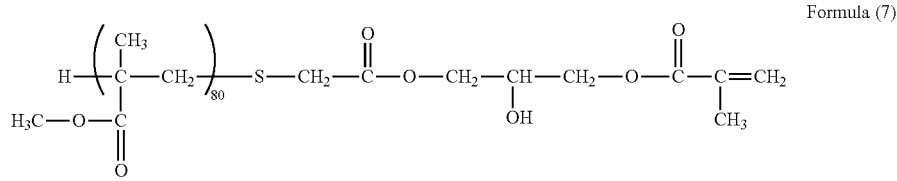

Thereafter, the following components were introduced into a glass flask equipped with a stirrer, a reflux condenser, a dripping funnel, a thermometer, and a gas inlet.

Compound represented by Formula (7) 70 parts

Product containing compound represented by example compound (F-10) as main component 30 parts Trifluorotoluene 270 parts Azobisisobutyronitrile 0.35 parts Nitrogen gas was introduced into the flask to which the above components were introduced, and reacted for 14 hours under reflux (heated to about 100° C.). The reaction solution was put into methanol in an amount 10 times greater than that of the reaction solution, precipitated, and filtered.

The obtained filtrate (1 part) was stirred in a mixed solution of 43 pans of methanol and 17 parts of deionized water for 15 minutes at 10° C., and then subjected to centrifugal filtration using a polypropylene filter. Methanol (40 parts) was further added to the obtained filtrate, stirred for 40 minutes at 10° C., and then subjected to centrifugal filtration using a polypropylene filter. The obtained filtrate was air-dried for 8 hours or longer and then dried under reduced pressure for 3 hours at 70° C. and an internal pressure of 260 mmHg or less by using a vacuum drier with a stirrer. In this way, a resin (P-1) was obtained which had a repeating structural unit derived from the example compound (F-10) and a repeating structural unit derived from the compound represented by Formula (7).

Manufacturing Example 2

A resin (P-2) was obtained in the same manner as in Manufacturing Example 1, except that in Manufacturing Example 1, the example compound (F-10) was changed to Formula (8).

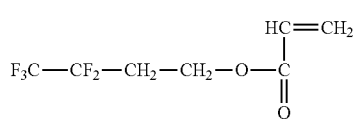

Formula (8)

Example A1

An aluminum cylinder having a diameter of 30 mm, a length of 357.5 mm, and a thickness of 0.7 mm was adopted as a support (electro-conductive support).

Then, 100 parts of zinc oxide particles (specific surface area: 19 m$^2$/g, powder resistance: 4.7×10$^6$ Ω·cm) and 500 parts of toluene were stirred and mixed together. A silane coupling agent (0.8 parts) was added to the mixture and stirred for 6 hours. Thereafter, toluene was distilled away under reduced pressure, and the mixture was dried by being heated for 6 hours at 130° C., thereby obtaining surface-treated zinc oxide particles. As the silane coupling agent, KBM-602 (trade name) (compound name: N-2-(amino-ethyl)-3-aminopropylmethyl dimethoxysilane) manufactured by Shin-Etsu Chemical Co., Ltd. was used.

Subsequently, 15 parts of polyvinyl butyral (weight-average molecular weight: 40,000, trade name: BM-1, manufactured by SEKISUI CHEMICAL CO., LTD.) as a polyol and 15 parts of blocked isocyanate (trade name: SUMIDUR 3175, manufactured by Sumika Covestro Urethane Co., Ltd.) were dissolved in a mixed solvent of 73.5 parts of methyl ethyl ketone and 73.5 parts of 1-butanol, thereby obtaining a solution. The surface-treated zinc oxide particles (80.8 parts) and 0.8 parts of 2,3,4-trihydroxybenzophenone (manufactured by TOKYO CHEMICAL INDUSTRY CO., LTD.) were added to the solution. The solution was put into a sand mill using glass beads having a diameter of 0.8 mm and subjected to a dispersion treatment for 3 hours in an atmosphere of 23±3° C.

After the dispersion treatment, 0.01 parts of silicone oil (trade name: SH28PA, manufactured by Dow Corning Toray Co., Ltd.) and 5.6 parts of crosslinked polymethyl methacrylate (PMMA) particles (trade name: TECHPOLYMER SSX-103, manufactured by SEKISUI PLASTICS CO., LTD., average particle diameter of primary particles: 3 μm) were added to the solution and stirred, thereby preparing a coating liquid for an under coating layer.

By dip-coating the aforementioned support with the coating liquid for an under coating layer, a coating film was formed. The obtained coating film was dried for 40 minutes at 160° C., thereby forming an under coating layer having a film thickness of 18 μm.

Then, 4 parts of hydroxygallium phthalocyanine crystals (charge generating substances) of a crystal form, which has a strong peak at a Bragg angle of 7.4° and 28.1° determined by 2θ±0.2° in the CuKα characteristic X-ray diffraction, and 0.04 parts of a compound represented by Formula (9) were added to a liquid which was obtained by dissolving 2 parts of polyvinyl butyral (trade name: S-LEC BX-1, manufactured by SEKISUI CHEMICAL CO., LTD.) in 100 parts of cyclohexanone. The obtained solution was put into a sand mill using glass beads having a diameter of 1 mm, and subjected to a dispersion treatment for 1 hour in an atmosphere of 23±3° C.

After the dispersion treatment, 100 parts of ethyl acetate was added thereto, thereby preparing a coating liquid for a charge generating layer.

By dip-coating the aforementioned under coating layer with the coating liquid for a charge generating layer, a coating film was formed. The obtained coating film was dried for 10 minutes at 90° C., thereby forming a charge generating layer having a film thickness of 0.19 μm.

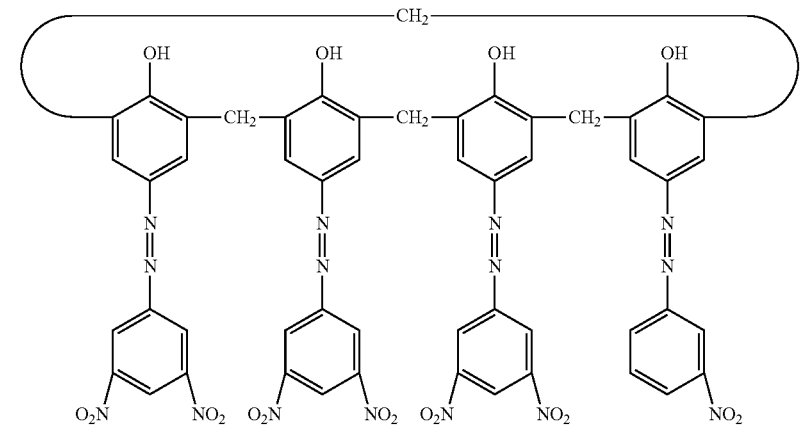

Formula (9)

Thereafter, 60 parts of a compound represented by Formula (10) (charge transport compound), 30 parts of a compound represented by Formula (11) (charge transport compound), 10 parts of a compound represented by Formula (12) (charge transport compound), 100 parts of polycarbonate (trade name: IUPILON Z400, manufactured by Mitsubishi Engineering-Plastics Corporation, bisphenol Z-type polycarbonate), and 0.2 parts of a resin having a structural unit represented by Formula (13) (viscosity-average molecular weight Mv: 20,000) were dissolved in a mixed solvent of 260 parts of o-xylene, 240 parts of methyl benzoate, and 260 parts of dimethoxymethane, thereby preparing a coating liquid for a charge transport layer.

By dip-coating the aforementioned charge generating layer with the coating liquid for a charge transport layer, a coating film was formed. The obtained coating film was dried for 60 minutes at 120° C., thereby forming a charge transport layer having a film thickness of 18 μm.

under a pressure of 40 MPa, thereby obtaining a dispersion liquid of resin particles containing fluorine atoms. The average panicle diameter of the resin particles containing fluorine atoms in the obtained dispersion liquid was 0.20 μm.

Then, 69.8 parts of a charge transport compound represented by an example compound (C-2), 0.10 parts of a compound represented by an example compound (A-1), 0.10 parts of a siloxane-modified acryl resin (trade name: SYMAC US-270, manufactured by TOAGOSEI CO., LTD.), 18 parts of 1,1,2,2,3,3,4-heptafluorocyclopentane, and 32 parts of 1-propanol were added to the dispersion liquid. Thereafter, the dispersion liquid was filtered through a Polyflon filter (trade name: PF-040, manufactured by Advantec Toyo Kaisha, Ltd.), thereby preparing a coating liquid for a surface layer.

By dip-coating the aforementioned charge transport layer with the coating liquid for a surface layer, a coating film was Formula (10)

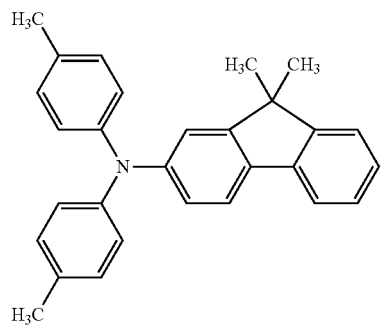

Formula (11)

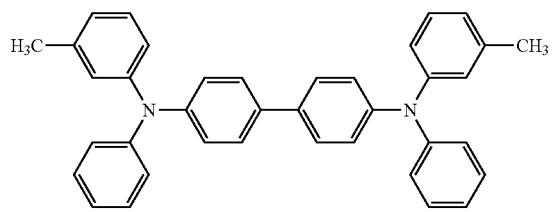

Formula (12)

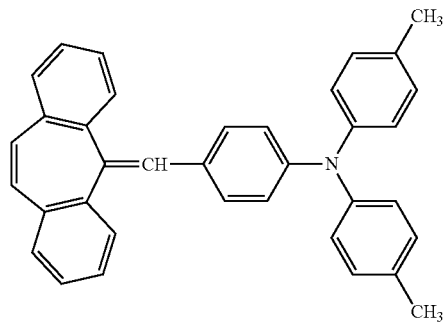

Formula (13)

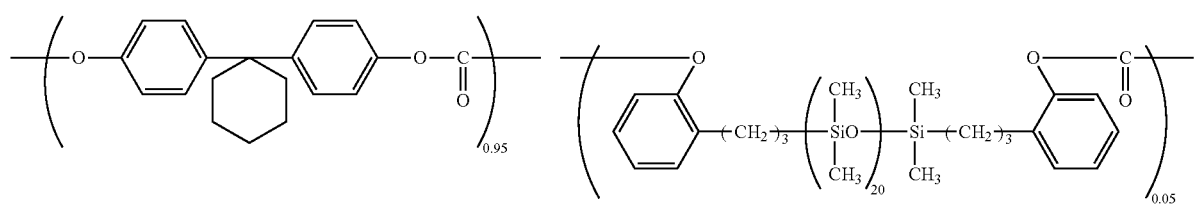

Subsequently 2.0 parts of the resin (P-1) was dissolved in a mixed solvent of 42 parts of 1,1,2,2,3,3,4-heptafluorocyclopentane (trade name: ZEORORA H, manufactured by ZEON CORPORATION) and 48 parts of 1-propanol. Then, 28 parts of polytetrafluoroethylene resin particles (trade name: LUBRON L-2, manufactured by DAIKIN INDUSTRIES, LTD.) was added thereto, thereby obtaining a liquid. The liquid was put into a high-pressure disperser (trade name: MICROFLUIDIZER M-110EH, manufactured by Microfluidics) and passed through the disperser 6 times formed. The obtained coating film was dried for 5 minutes at 40° C. After being dried, the coating film was irradiated with electron beams for 1.6 seconds in a nitrogen atmosphere under the condition of an acceleration voltage of 70 kV and an absorbed dose of 15 kGy. Then, a heating treatment was performed for 10 seconds in a nitrogen atmosphere under the condition by which the temperature of the coating film became 135° C. The oxygen concentration was kept at 10 ppm from the electron beam irradiation to 10 seconds of the heating treatment. Subsequently, a heating treatment was performed for 1 hour in the atmosphere under the condition by which the temperature of the coating film became 100° C., thereby forming a surface layer having a film thickness of 5 µm.

In this way, an electrophotographic photoreceptor of Example A1 having an under coating layer, a charge generating layer, a charge transport layer, and a surface layer on an electro-conductive support was prepared for each of the evaluation of abrasion loss, the evaluation of scratched images, the evaluation of 17-gradation images, and the evaluation of potential variation.

[Evaluation of Abrasion Loss]

As an electrophotographic apparatus for evaluation, an altered copy machine (trade name: image RUNNER iR-ADVC5051) manufactured by Canon Inc. was used.

The electrophotographic photoreceptor of each of the examples and the comparative examples was used after being left to stand in an environment with temperature of 15° C./humidity of 10% RH for 3 days together with the aforementioned copy machine.

For obtaining initial images, the electrophotographic photoreceptor of each of the examples was mounted on a process cartridge for black, the process cartridge was set in a black station of the body, and images were printed lengthwise on 200,000 sheets of A4 paper at an image ratio of 5%. The difference in a film thickness of the photosensitive layer before and after the printing of 200,000 sheets of images was regarded as an abrasion loss and evaluated. The evaluation results are shown in Table 1. In a case where the abrasion loss was 2.0 µm or less, it is possible to determine that the abrasion resistance is excellent.

[Evaluation of Scratched Images]

As an electrophotographic apparatus for evaluation, an altered copy machine (trade name: image RUNNER iR-ADVC051) manufactured by Canon Inc. was used.

The electrophotographic photoreceptor of each of the examples and the comparative examples was used after being left to stand in an environment with temperature of 15° C./humidity of 10% RH for 3 days together with the aforementioned copy machine.

For obtaining initial images, the electrophotographic photoreceptor of each of the examples was mounted on a process cartridge for black, the process cartridge was set in a black station of the body, and images were printed lengthwise on 200,000 sheets of A4 paper at an image ratio of 5%. By visual observation, whether or not an image defect (scratched image) caused by scratching of the surface of the electrophotographic photoreceptor occurred was checked whenever 10,000 sheets of images had been printed. The evaluation results are shown in Table 1. In a case where no scratched image occurred while 200,000 sheets of paper was being passed through the electrophotographic apparatus, it is possible to determine that the scratch resistance is excellent.

[Evaluation of 17-Gradation Images]

As an electrophotographic apparatus for evaluation, an altered copy machine (trade name: image RUNNER iR-ADVC051) manufactured by Canon Inc. was used.

The electrophotographic photoreceptor of each of the examples and the comparative examples was used after being left to stand in an environment with temperature of 15° C./humidity of 10% RH for 3 days together with the aforementioned copy machine.

For obtaining initial images, the electrophotographic photoreceptor of each of the examples was mounted on a process cartridge for black, the process cartridge was set in a black station of the body, and images were printed lengthwise on 200,000 sheets of A4 paper at an image ratio of 5%. Then, an image having 17 gradations was formed, and the obtained image on the entire surface of the A4 paper was ranked based on the following determination standards.

A: no vertical streak occurred, and image reproducibility was excellent.
B: although slight vertical streaks were seen, in portions other than these, image reproducibility was excellent.
C: although a slight defect was observed in a case where the image was magnified, image reproducibility was excellent.
D: apparent vertical streaks occurred, and image reproducibility was low.

The evaluation results are shown in Table 1. In a case where the images are ranked A or B, it is possible to determine that the cleaning properties are excellent.

[Evaluation of Potential Variation]

For measuring a surface potential of the electrophotographic photoreceptor, a cartridge for development was detached from an evaluation apparatus, and a potential measuring apparatus was inserted instead. The potential measuring apparatus was configured by disposing a potential measuring probe in a development position of the cartridge for development. The potential measuring probe was positioned at the center of the electrophotographic photoreceptor in the direction of bus bar.

For measuring the potential, first, applied potential was adjusted such that an initial dark part potential became −700 V: Exposure and irradiation were performed using a 780 nm laser at a certain exposure amount, and an initial bright part potential (described as "initial VL") was measured.

Then, the cartridge for development was mounted on the evaluation apparatus, and 1,000 sheets of images were printed. After 1,000 sheets of the images were printed, the cartridge for development was left to stand for 5 minutes and mounted on the potential measuring apparatus, and a bright part potential of each of the electrophotographic photoreceptors after repeated use (described as "VL after endurance") was measured. The absolute value of a potential difference between "VL after endurance" and "initial VL" was calculated as potential variation. The evaluation results are shown in Table 1. In a case where the potential variation is 25 V or less, it is possible to determine that the potential variation is excellent.

Example A2

An electrophotographic photoreceptor of Example A2 was prepared in the same manner as in Example A1, except that in Example A1, the charge transport compound used in the coating liquid for a surface layer was changed to an example compound (C-4). In addition, the evaluation of abrasion loss, the evaluation of scratched images, the evaluation of 17-gradation images, and the evaluation of potential variation were performed. The results are shown in Table 1.

Example A3

An electrophotographic photoreceptor of Example A3 was prepared in the same manner as in Example A1, except that in Example A1, the charge transport compound used in the coating liquid for a surface layer was changed to an example compound (C-17). In addition, the evaluation of abrasion loss, the evaluation of scratched images, the evaluation of 17-gradation images, and the evaluation of potential variation were performed. The results are shown in Table 1.

Example A4

An electrophotographic photoreceptor of Example A4 was prepared in the same manner as in Example A1, except that in Example A1, the compound represented by the example compound (A-1) used in the coating liquid for a surface layer was changed to an example compound (A-25). In addition, the evaluation of abrasion loss, the evaluation of scratched images, the evaluation of 17-gradation images, and the evaluation of potential variation were performed. The results are shown in Table 1.

Example A5

Until the formation of a charge transport layer, the same procedure as in Example A1 was performed.

Then, 0.4 parts of the resin (P-1) was dissolved in a mixed solvent of 8 parts of 1,1,2,2,3,3,4-heptafluorocyclopentane (trade name: ZEORORA H, manufactured by ZEON CORPORATION) and 10 parts of 1-propanol. Thereafter, 6 parts of polytetrafluoroethylene resin particles (trade name: LUBRON L-2, manufactured by DAIKIN INDUSTRIES, LTD.) were added thereto, thereby obtaining a liquid. The liquid was put into a high-pressure disperser (trade name: MICROFLUIDIZER M-110EH, manufactured by Microfluidics) and passed through the disperser 6 times under a pressure of 40 MPa, thereby obtaining a dispersion liquid of resin particles containing fluorine atoms. The average particle diameter of the resin particles containing fluorine atoms in the obtained dispersion liquid was 0.20 μm.

Then, 93.4 parts of a charge transport compound represented by the example compound (C-2), 0.10 parts of a compound represented by the example compound (A-1), 0.10 parts of a siloxane-modified acryl resin (trade name: SYMAC US-270, manufactured by TOAGOSEI CO., LTD.), 52 parts of 1,1,2,2,3,3,4-heptafluorocyclopentane, and 70 parts of 1-propanol were added to the dispersion liquid. Thereafter, the dispersion liquid was filtered through a Polyflon filter (trade name: PF-040, manufactured by Advantec Toyo Kaisha, Ltd.), thereby preparing a coating liquid for a surface layer.

By dip-coating the aforementioned charge transport layer with the coating liquid for a surface layer, a coating film was formed. Furthermore, in the same manner as in Example A1, a surface layer having a film thickness of 5 μm was formed In this way, an electrophotographic photoreceptor of Example A5 having an under coating layer, a charge generating layer, a charge transport layer, and a surface layer on an electro-conductive support was prepared, and the evaluation of abrasion loss, the evaluation of scratched images, the evaluation of 17-gradation images, and the evaluation of potential variation were performed. The results are shown in Table 1.

Example A6

Until the formation of a charge transport layer, the same procedure as in Example A1 was performed.

Then, 1.5 parts of the resin (P-1) was dissolved in a mixed solvent of 42 parts of 1,1,2,2,3,3,4-heptafluorocyclopentane (trade name: ZEORORA H, manufactured by ZEON CORPORATION) and 48 parts of 1-propanol. Thereafter, 28 parts of polytetrafluoroethylene resin particles (trade name: LUBRON L-2, manufactured by DAIKIN INDUSTRIES, LTD.) were added thereto, thereby obtaining a liquid. The liquid was put into a high-pressure disperser (trade name: MICROFLUIDIZER M-110EH, manufactured by Microfluidics) and passed through the disperser 6 times under a pressure of 40 MPa, thereby obtaining a dispersion liquid of resin particles containing fluorine atoms. The average particle diameter of the resin particles containing fluorine atoms in the obtained dispersion liquid was 0.20 μm.

Then, 70.3 parts of a charge transport compound represented by the example compound (C-2), 0.10 parts of a compound represented by the example compound (A-1), 0.10 parts of a siloxane-modified acryl resin (trade name: SYMAC US-270, manufactured by TOAGOSEI CO., LTD.), 18 parts of 1,1,2,2,3,3,4-heptafluorocyclopentane, and 32 parts of 1-propanol were added to the dispersion liquid. Thereafter, the dispersion liquid was filtered through a Polyflon filter (trade name: PF-040, manufactured by Advantec Toyo Kaisha, Ltd.), thereby preparing a coating liquid for a surface layer.

By dip-coating the aforementioned charge transport layer with the coating liquid for a surface layer, a coating film was formed. Furthermore, in the same manner as in Example A1, a surface layer having a film thickness of 5 μm was formed.

In this way, an electrophotographic photoreceptor of Example A6 having an under coating layer, a charge generating layer, a charge transport layer, and a surface layer on an electro-conductive support was prepared, and the evaluation of abrasion loss, the evaluation of scratched images, the evaluation of 17-gradation images, and the evaluation of potential variation were performed. The results are shown in Table 1.

Example A7

Until the formation of a charge transport layer, the same procedure as in Example A1 was performed.

Then, 3.0 parts of the resin (P-1) was dissolved in a mixed solvent of 42 parts of 1,1,2,2,3,3,4-heptafluorocyclopentane (trade name: ZEORORA H, manufactured by ZEON CORPORATION) and 48 parts of 1-propanol. Thereafter, 28 parts of polytetrafluoroethylene resin particles (trade name: LUBRON L-2, manufactured by DAIKIN INDUSTRIES, LTD.) were added thereto, thereby obtaining a liquid. The liquid was put into a high-pressure disperser (trade name: MICROFLUIDIZER M-110EH, manufactured by Microfluidics) and passed through the disperser 6 times under a pressure of 40 MPa, thereby obtaining a dispersion liquid of resin particles containing fluorine atoms. The average particle diameter of the resin particles containing fluorine atoms in the obtained dispersion liquid was 0.20 μm.

Subsequently, 68.8 parts of a charge transport compound represented by the example compound (C-2), 0.10 parts of a compound represented by the example compound (A-1), 0.10 parts of a siloxane-modified acryl resin (trade name: SYMAC US-270, manufactured by TOAGOSEI CO., LTD.), 18 parts of 1,1,2,2,3,3,4-heptafluorocyclopentane, and 32 parts of 1-propanol were added to the dispersion liquid. Thereafter, the dispersion liquid was filtered through a Polyflon filter (trade name: PF-040, manufactured by Advantec Toyo Kaisha, Ltd.), thereby preparing a coating liquid for a surface layer.

By dip-coating the aforementioned charge transport layer with the coating liquid for a surface layer, a coating film was formed. Furthermore, in the same manner as in Example A1, a surface layer having a film thickness of 5 μm was formed.

In this way, an electrophotographic photoreceptor of Example A7 having an under coating layer, a charge generating layer, a charge transport layer, and a surface layer on an electro-conductive support was prepared, and the evaluation of abrasion loss, the evaluation of scratched images, the evaluation of 17-gradation images, and the evaluation of potential variation were performed. The results are shown in Table 1.

Example A8

Until the formation of a surface layer, the same procedure as in Example A1 was performed.

Then, the surface of the electrophotographic photoreceptor was roughened by polishing.

In the present example, polishing was performed using a polishing apparatus illustrated in FIG. 5 under the following condition.
Feeding speed of polishing sheet: 400 mm/min
Rotation speed of electrophotographic photoreceptor; 450 rpm
Indentation of electrophotographic photoreceptor pressed on backup roller; 3.5 mm
Rotation direction of polishing sheet and electrophotographic photoreceptor; width backup roller; outer diameter of 100 mm, Asker C hardness of 25

As the polishing sheet mounted on the polishing apparatus, a polishing sheet GC 3000 (surface roughness Ra of the polishing sheet: 0.83 µm) manufactured by RIKEN CORUNDUM CO., LTD. was used.

The surface of the electrophotographic photoreceptor was polished for 10 seconds under the condition described above, thereby preparing an electrophotographic photoreceptor of Example A8 whose surface was roughened by polishing. In addition, the evaluation of abrasion loss, the evaluation of scratched images, the evaluation of 17-gradation images, and the evaluation of potential variation were performed. The results are shown in Table 1.

Example A9

Until the formation of a surface layer, the same procedure as in Example A1 was performed.

Then, the surface of the electrophotographic photoreceptor was processed.

In the pressure-contact shape transfer processing apparatus having the configuration illustrated in FIG. 4, a mold having the shape illustrated in FIG. 3A to FIG. 3C was installed (in the present example, the mold had projections each having a maximum width X: 30 µm, a maximum length Y: 75 µm, an area ratio: 60%, and a height H: 1.6 µm), and the peripheral surface of the prepared electrophotographic photoreceptor, on which depressions had not yet been formed, was processed to form depressions.

In this way, an electrophotographic photoreceptor of Example A9 having depression formed on the surface thereof through processing was prepared, and the evaluation of abrasion loss, the evaluation of scratched images, the evaluation of 17-gradation images, and the evaluation of potential variation were performed. The results are shown in Table 1.

Example A10

An electrophotographic photoreceptor of Example A10 was prepared in the same manner as in Example A1, except that in Example A1, the amount of the charge transport compound (example compound (C-2)) used in the coating liquid for a surface layer was changed to 68.9 parts, and the amount of the example compound (A-1) was changed to 1.00 part. Furthermore, the evaluation of abrasion loss, the evaluation of scratched images, the evaluation of 17-gradation images, and the evaluation of potential variation were performed. The results are shown in Table 1.

Example A11

Until the formation of a charge transport layer, the same procedure as in Example A1 was performed.

Then, a dispersion liquid of resin particles containing fluorine atoms was obtained in the same manner as in Example A1.

Thereafter, 58.0 parts of a charge transport compound represented by the example compound (C-2), 10.9 parts of trimethylolpropane triacrylate (TMPTA, manufactured by TOKYO CHEMICAL INDUSTRY CO., LTD.), 1.00 part of a compound represented by the example compound (A-1), 0.10 parts of a siloxane-modified acryl resin (trade name: SYMAC US-270, manufactured by TOAGOSEI CO., LTD.), 52 parts of 1,1,2,2,3,3,4-heptafluorocyclopentane, and 70 parts of 1-propanol were added to the dispersion liquid. Thereafter, the dispersion liquid was filtered through a Polyflon filter (trade name: PF-040, manufactured by Advantec Toyo Kaisha, Ltd.), thereby preparing a coating liquid for a surface layer.

By dip-coating the aforementioned charge transport layer with the coating liquid for a surface layer, a coating film was formed. Furthermore, in the same manner as in Example A1, a surface layer having a film thickness of 5 µm was formed.

In this way, an electrophotographic photoreceptor of Example A11 having an under coating layer, a charge generating layer, a charge transport layer, and a surface layer on an electro-conductive support was prepared, and the evaluation of abrasion loss, the evaluation of scratched images, the evaluation of 17-gradation images, and the evaluation of potential variation were performed. The results are shown in Table 1.

Example A12

An electrophotographic photoreceptor of Example A12 was prepared in the same manner as in Example A11, except that in Example A11, the amount of the trimethylolpropane triacrylate used in the coating liquid for a surface layer was changed to 1.9 parts, and the amount of the example compound (A-1) was changed to 10.00 parts. In addition, the evaluation of abrasion loss, the evaluation of scratched images, the evaluation of 17-gradation images, and the evaluation of potential variation were performed. The results are shown in Table 1.

Example A13

An electrophotographic photoreceptor of Example A13 was prepared in the same manner as in Example A1, except that in Example A1, the compound represented by the example compound (A-1) used in the coating liquid for a surface layer was changed to an example compound (A-2). In addition, the evaluation of abrasion loss, the evaluation of scratched images, the evaluation of 17-gradation images, and the evaluation of potential variation were performed. The results are shown in Table 1.

Example A14

An electrophotographic photoreceptor of Example A14 was prepared in the same manner as in Example A1, except that in Example A1, the compound represented by the example compound (A-1) used in the coating liquid for a surface layer was changed to an example compound (A-14). In addition, the evaluation of abrasion loss, the evaluation of scratched images, the evaluation of 17-gradation images, and the evaluation of potential variation were performed. The results are shown in Table 1.

Example A15

An electrophotographic photoreceptor of Example A15 was prepared in the same manner as in Example A1, except that in Example A1, the amount of the charge transport compound (example compound (C-2)) used in the coating liquid for a surface layer was changed to 58.0 parts, and the amount of the example compound (A-1) was changed to 11.90 parts. In addition, the evaluation of abrasion loss, the evaluation of scratched images, the evaluation of 17-gradation images, and the evaluation of potential variation were performed. The results are shown in Table 1.

Example A16

Until the formation of a charge transport layer, the same procedure as in Example A1 was performed.

Then, a dispersion liquid of resin particles containing fluorine atoms was obtained in the same manner as in Example A1.

Thereafter, 69.7 parts of a charge transport compound represented by the example compound (C-2), 0.10 parts of a compound represented by the example compound (A-1), 0.10 parts of a compound represented by Formula (14), 0.10 parts of a siloxane-modified acryl resin (trade name: SYMAC US-270, manufactured by TOAGOSEI CO., LTD.), 52 parts of 1,1,2,2,3,3,4-heptafluorocyclopentane, and 70 parts of 1-propanol were added to the dispersion liquid. Thereafter, the dispersion liquid was filtered through a Polyflon filter (trade name: PF-040, manufactured by Advantec Toyo Kaisha, Ltd.), thereby preparing a coating liquid for a surface layer.

By dip-coating the aforementioned charge transport layer with the coating liquid for a surface layer, a coating film was formed. Furthermore, in the same manner as in Example A1, a surface layer having a film thickness of 5 μm was formed.

In this way, an electrophotographic photoreceptor of Example A16 having an under coating layer, a charge generating layer, a charge transport layer, and a surface layer on an electro-conductive support was prepared, and the evaluation of abrasion loss, the evaluation of scratched images, the evaluation of 17-gradation images, and the evaluation of potential variation were performed. The results are shown in Table 1.

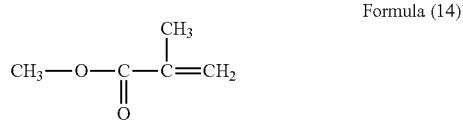

Formula (14)

Example A17

An electrophotographic photoreceptor of Example A17 was prepared in the same manner as in Example A1, except that in Example A1, the amount of the charge transport compound (example compound (C-2)) used in the coating liquid for a surface layer was changed to 68.9 parts, and the amount of the siloxane-modified acryl resin was changed to 1.00 part. In addition, the evaluation of abrasion loss, the evaluation of scratched images, the evaluation of 17-gradation images, and the evaluation of potential variation were performed. The results are shown in Table 1.

Example A18

An electrophotographic photoreceptor of Example A18 was prepared in the same manner as in Example A17, except that in Example A17, the siloxane-modified acryl resin used in the coating liquid for a surface layer was changed to a siloxane-modified acryl resin (trade name: BYK-3550, manufactured by BYK-Chemie Japan K.K.). In addition, the evaluation of abrasion loss, the evaluation of scratched images, the evaluation of 17-gradation images, and the evaluation of potential variation were performed. The results are shown in Table 1.

Example B1

An electrophotographic photoreceptor of Example B1 was prepared in the same manner as in Example A1, except that in Example A1, the amount of the charge transport compound (example compound (C-2)) used in the coating liquid for a surface layer was changed to 69.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B2

An electrophotographic photoreceptor of Example B2 was prepared in the same manner as in Example A2, except that in Example A2, the amount of the charge transport compound (example compound (C-4)) used in the coating liquid for a surface layer was changed to 69.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B3

An electrophotographic photoreceptor of Example B3 was prepared in the same manner as in Example A3, except that in Example A3, the amount of the charge transport compound (example compound (C-17)) used in the coating liquid for a surface layer was changed to 69.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B4

An electrophotographic photoreceptor of Example B4 was prepared in the same manner as in Example A4, except that in Example A4, the amount of the charge transport compound (example compound (C-2)) used in the coating liquid for a surface layer was changed to 69.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B5

An electrophotographic photoreceptor of Example B5 was prepared in the same manner as in Example A5, except that in Example A5, the amount of the charge transport compound (example compound (C-2)) used in the coating liquid for a surface layer was changed to 93.5 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B6

An electrophotographic photoreceptor of Example B6 was prepared in the same manner as in Example A6, except that in Example A6, the amount of the charge transport compound (example compound (C-2)) used in the coating liquid for a surface layer was changed to 70.4 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B7

An electrophotographic photoreceptor of Example B7 was prepared in the same manner as in Example A7, except that in Example A7, the amount of the charge transport compound (example compound (C-2)) used in the coating liquid for a surface layer was changed to 68.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B8

An electrophotographic photoreceptor of Example B8 was prepared in the same manner as in Example A8, except that in Example A8, the amount of the charge transport compound (example compound (C-2)) used in the coating liquid for a surface layer was changed to 69.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B9

An electrophotographic photoreceptor of Example B9 was prepared in the same manner as in Example A9, except that in Example A9, the amount of the charge transport compound (example compound (C-2)) used in the coating liquid for a surface layer was changed to 69.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B10

An electrophotographic photoreceptor of Example B10 was prepared in the same manner as in Example A10, except that in Example A10, the amount of the charge transport compound (example compound (C-2)) used in the coating liquid for a surface layer was changed to 69.0 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B11

An electrophotographic photoreceptor of Example B11 was prepared in the same manner as in Example A11, except that in Example A11, the amount of the trimethylolpropane triacrylate used in the coating liquid for a surface layer was changed to 11.0 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B12

An electrophotographic photoreceptor of Example B12 was prepared in the same manner as in Example A12, except that in Example A12, the amount of the trimethylolpropane triacrylate used in the coating liquid for a surface layer was changed to 2.0 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B13

An electrophotographic photoreceptor of Example B13 was prepared in the same manner as in Example A13, except that in Example A13, the amount of the charge transport compound (example compound (C-2)) used in the coating liquid for a surface layer was changed to 69.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B14

An electrophotographic photoreceptor of Example B14 was prepared in the same manner as in Example A14, except that in Example A14, the amount of the charge transport compound (example compound (C-2)) used in the coating liquid for a surface layer was changed to 69.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B15

An electrophotographic photoreceptor of Example B15 was prepared in the same manner as in Example A15, except that in Example A15, the amount of the example compound (A-1) used in the coating liquid for a surface layer was changed to 12.00 pans, and the siloxane-modified acryl resin was not used. In addition, the evaluation of abrasion loss, the evaluation of scratched images, the evaluation of 17-gradation images, and the evaluation of potential variation were performed. The results are shown in Table 1.

Example B16

An electrophotographic photoreceptor of Example B16 was prepared in the same manner as in Example A16, except that in Example A16, the amount of the charge transport compound (example compound (C-2)) used in the coating liquid for a surface layer was changed to 69.8 parts, and the siloxane-modified acryl resin was not used. In addition, the evaluation of abrasion loss, the evaluation of scratched images, the evaluation of 17-gradation images, and the evaluation of potential variation were performed. The results are shown in Table 1.

Thereafter, 57.8 parts of a charge transport compound represented by the example compound (C-2), 12.0 parts of trimethylolpropane triacrylate, 0.10 parts of a compound represented by the example compound (A-1), 0.10 parts of a siloxane-modified acryl resin (trade name: SYMAC US-270, manufactured by TOAGOSEI CO., LTD.), 52 parts of 1,1,2,2,3,3,4-heptafluorocyclopentane, and 70 parts of 1-propanol were added to the dispersion liquid. Thereafter, the dispersion liquid was filtered through a Polyflon filter (trade name: PF-040, manufactured by Advantec Toyo Kaisha, Ltd.), thereby preparing a coating liquid for a surface layer.

By dip-coating the aforementioned charge transport layer with the coating liquid for a surface layer, a coating film was formed. Furthermore, in the same manner as in Example A1, a surface layer having a film thickness of 5 µm was formed.

In this way, an electrophotographic photoreceptor of Example C1 having an under coating layer, a charge generating layer, a charge transport layer, and a surface layer on an electro-conductive support was prepared, and the evaluation of abrasion loss, the evaluation of scratched images,

TABLE 1

|  | Abrasion loss (µm) | Occurrence of scratched image | Rank in 17-gradation image | Potential variation (V) |
|---|---|---|---|---|
| Example A1 | 1.6 | No scratched image occured in 200,000 sheets | A | 10 |
| Example A2 | 1.6 | No scratched image occured in 200,000 sheets | A | 10 |
| Example A3 | 1.6 | No scratched image occured in 200,000 sheets | A | 10 |
| Example A4 | 1.6 | No scratched image occured in 200,000 sheets | A | 10 |
| Example A5 | 1.6 | No scratched image occured in 200,000 sheets | A | 10 |
| Example A6 | 1.6 | No scratched image occured in 200,000 sheets | A | 10 |
| Example A7 | 1.6 | No scratched image occured in 200,000 sheets | A | 10 |
| Example A8 | 1.4 | No scratched image occured in 200,000 sheets | A | 10 |
| Example A9 | 1.4 | No scratched image occured in 200,000 sheets | A | 10 |
| Example A10 | 1.6 | No scratched image occured in 200,000 sheets | A | 10 |
| Example A11 | 1.6 | No scratched image occured in 200,000 sheets | A | 10 |
| Example A12 | 1.6 | No scratched image occured in 200,000 sheets | A | 10 |
| Example A13 | 1.8 | No scratched image occured in 200,000 sheets | A | 15 |
| Example A14 | 1.8 | No scratched image occured in 200,000 sheets | A | 15 |
| Example A15 | 2.0 | No scratched image occured in 200,000 sheets | A | 15 |
| Example A16 | 1.6 | No scratched image occured in 200,000 sheets | A | 5 |
| Example A17 | 1.6 | No scratched image occured in 200,000 sheets | A | 10 |
| Example A18 | 1.6 | No scratched image occured in 200,000 sheets | A | 10 |
| Example B1 | 1.6 | No scratched image occured in 200,000 sheets | B | 10 |
| Example B2 | 1.6 | No scratched image occured in 200,000 sheets | B | 10 |
| Example B3 | 1.6 | No scratched image occured in 200,000 sheets | B | 10 |
| Example B4 | 1.6 | No scratched image occured in 200,000 sheets | B | 10 |
| Example B5 | 1.6 | No scratched image occured in 200,000 sheets | B | 10 |
| Example B6 | 1.6 | No scratched image occured in 200,000 sheets | B | 10 |
| Example B7 | 1.6 | No scratched image occured in 200,000 sheets | B | 10 |
| Example B8 | 1.4 | No scratched image occured in 200,000 sheets | B | 10 |
| Example B9 | 1.4 | No scratched image occured in 200,000 sheets | B | 10 |
| Example B10 | 1.6 | No scratched image occured in 200,000 sheets | B | 10 |
| Exempts B11 | 1.6 | No scratched image occured in 200,000 sheets | B | 10 |
| Example B12 | 1.6 | No scratched image occured in 200,000 sheets | B | 10 |
| Example B13 | 1.8 | No scratched image occured in 200,000 sheets | B | 15 |
| Example B14 | 1.8 | No scratched image occured in 200,000 sheets | B | 15 |
| Example B15 | 2.0 | No scratched image occured in 200,000 sheets | B | 15 |
| Example B16 | 1.6 | No scratched image occured in 200,000 sheets | B | 10 |

Example C1

Until the formation of a charge transport layer, the same procedure as in Example A1 was performed.

Then, a dispersion liquid of resin particles containing fluorine atoms was obtained in the same manner as in Example A1.

the evaluation of 17-gradation images, and the evaluation of potential variation were performed. The results are shown in Table 2.

Example C2

An electrophotographic photoreceptor of Example C2 was prepared in the same manner as in Example C1, except that in Example C1, the charge transport compound used in the coating liquid for a surface layer was changed to the example compound (C-4). In addition, the evaluation of abrasion loss, the evaluation of scratched images, the evaluation of 17-gradation images, and the evaluation of potential variation were performed. The results are shown in Table 2.

Example C3

An electrophotographic photoreceptor of Example C3 was prepared in the same manner as in Example C1, except that in Example C1, the charge transport compound used in the coating liquid for a surface layer was changed to the example compound (C-17). In addition, the evaluation of abrasion loss, the evaluation of scratched images, the evaluation of 17-gradation images, and the evaluation of potential variation were performed. The results are shown in Table 2.

Example C4

An electrophotographic photoreceptor of Example C4 was prepared in the same manner as in Example C1, except that in Example C1, the compound represented by the example compound (A-1) used in the coating liquid for a surface layer was changed to the example compound (A-25). In addition, the evaluation of abrasion loss, the evaluation of scratched images, the evaluation of 17-gradation images, and the evaluation of potential variation were performed. The results are shown in Table 2.

Example C5

Until the formation of a charge transport layer, the same procedure as in Example A1 was performed.

Then, 0.4 parts of the resin (P-1) was dissolved in a mixed solvent of 8 parts of 1,1,2,2,3,3,4-heptafluorocyclopentane (trade name: ZEORORA H, manufactured by ZEON CORPORATION) and 10 parts of 1-propanol. Thereafter, 6 parts of polytetrafluoroethylene resin particles (trade name: LUBRON L-2, manufactured by DAIKIN INDUSTRIES, LTD.) was added thereto, thereby obtaining a liquid. The liquid was put into a high-pressure disperser (trade name: MICROFLUIDIZER M-110EH, manufactured by Microfluidics) and passed through the disperser 6 times under a pressure of 40 MPa, thereby obtaining a dispersion liquid of resin particles containing fluorine atoms. The average particle diameter of the resin particles containing fluorine atoms in the obtained dispersion liquid was 0.20 µm.

Subsequently, 57.8 parts of a charge transport compound represented by the example compound (C-2), 35.6 parts of trimethylolpropane triacrylate, 0.10 parts of a compound represented by the example compound (A-1), 0.10 parts of a siloxane-modified acryl resin (trade name: SYMAC US-270, manufactured by TOAGOSEI CO., LTD.), 52 parts of 1,1,2,2,3,3,4-heptafluorocyclopentane, and 70 parts of 1-propanol were added to the dispersion liquid. Thereafter, the dispersion liquid was filtered through a Polyflon filter (trade name: PF-040, manufactured by Advantec Toyo Kaisha, Ltd.), thereby preparing a coating liquid for a surface layer.

By dip-coating the aforementioned charge transport layer with the coating liquid for a surface layer, a coating film was formed. Furthermore, in the same manner as in Example A1, a surface layer having a film thickness of 5 µm was formed.

In this way, an electrophotographic photoreceptor of Example C5 having an under coating layer, a charge generating layer, a charge transport layer, and a surface layer on an electro-conductive support was prepared, and the evaluation of abrasion loss, the evaluation of scratched images, the evaluation of 17-gradation images, and the evaluation of potential variation were performed. The results are shown in Table 2.

Example C6

Until the formation of a charge transport layer, the same procedure as in Example A1 was performed.

Then, 0.4 parts of the resin (P-1) was dissolved in a mixed solvent of 8 parts of 1,1,2,2,3,3,4-heptafluorocyclopentane (trade name: ZEORORA H, manufactured by ZEON CORPORATION) and 10 parts of 1-propanol. Thereafter, 6 parts of polytetrafluoroethylene resin particles (trade name: LUBRON L-2, manufactured by DAIKIN INDUSTRIES, LTD.) was added thereto, thereby obtaining a liquid. The liquid was put into a high-pressure disperser (trade name: MICROFLUIDIZER M-110EH, manufactured by Microfluidics) and passed through the disperser 6 times under a pressure of 40 MPa, thereby obtaining a dispersion liquid of resin particles containing fluorine atoms. The average particle diameter of the resin particles containing fluorine atoms in the obtained dispersion liquid was 0.20 µm.

Subsequently, 57.8 parts of a charge transport compound represented by the example compound (C-2), 12.5 parts of trimethylolpropane triacrylate, 0.10 parts of a compound represented by the example compound (A-1), 0.10 parts of a siloxane-modified acryl resin (trade name: SYMAC US-270, manufactured by TOAGOSEI CO., LTD.), 52 parts of 1,1,2,2,3,3,4-heptafluorocyclopentane, and 70 parts of 1-propanol were added to the dispersion liquid. Thereafter, the dispersion liquid was filtered through a Polyflon filter (trade name: PF-040, manufactured by Advantec Toyo Kaisha, Ltd.), thereby preparing a coating liquid for a surface layer.

By dip-coating the aforementioned charge transport layer with the coating liquid for a surface layer, a coating film was formed. Furthermore, in the same manner as in Example A1, a surface layer having a film thickness of 5 µm was formed.

In this way, an electrophotographic photoreceptor of Example C6 having an under coating layer, a charge generating layer, a charge transport layer, and a surface layer on an electro-conductive support was prepared, and the evaluation of abrasion loss, the evaluation of scratched images, the evaluation of 17-gradation images, and the evaluation of potential variation were performed. The results are shown in Table 2.

Example C7

Until the formation of a charge transport layer, the same procedure as in Example A1 was performed.

Then, 3.0 parts of the resin (P-1) was dissolved in a mixed solvent of 42 parts of 1,1,2,2,3,3,4-heptafluorocyclopentane (trade name: ZEORORA H, manufactured by ZEON CORPORATION) and 48 parts of 1-propanol. Thereafter, 28 parts of polytetrafluoroethylene resin particles (trade name: LUBRON L-2, manufactured by DAIKIN INDUSTRIES, LTD.) was added thereto, thereby obtaining a liquid. The liquid was put into a high-pressure disperser (trade name: MICROFLUIDIZER M-110EH, manufactured by Microfluidics) and passed through the disperser 6 times under a pressure of 40 MPa, thereby obtaining a dispersion liquid of resin particles containing fluorine atoms. The average particle diameter of the resin particles containing fluorine atoms in the obtained dispersion liquid was 0.20 µm.

Subsequently, 57.8 parts of a charge transport compound represented by the example compound (C-2), 11.0 parts of trimethylolpropane triacrylate, 0.10 parts of a compound represented by the example compound (A-1), 0.10 parts of a siloxane-modified acryl resin (trade name: SYMAC US-270, manufactured by TOAGOSEI CO., LTD.), 18 parts of 1,1,2,2,3,3,4-heptafluorocyclopentane, and 32 parts of 1-propanol were added to the dispersion liquid. Thereafter, the dispersion liquid was filtered through a Polyflon filter (trade name: PF-040, manufactured by Advantec Toyo Kaisha, Ltd.), thereby preparing a coating liquid for a surface layer.

By dip-coating the aforementioned charge transport layer with the coating liquid for a surface layer, a coating film was formed. Furthermore, in the same manner as in Example A1, a surface layer having a film thickness of 5 µm was formed.

In this way, an electrophotographic photoreceptor of Example C7 having an under coating layer, a charge generating layer, a charge transport layer, and a surface layer on an electro-conductive support was prepared, and the evaluation of abrasion loss, the evaluation of scratched images, the evaluation of 17-gradation images, and the evaluation of potential variation were performed. The results are shown in Table 2.

Example C8

Until the formation of a surface layer, the same procedure as in Example C1 was performed.

Then, the surface of the electrophotographic photoreceptor was roughened by polishing. Polishing was performed using a polishing apparatus illustrated in FIG. 5 under the following condition.
Feeding speed of polishing sheet; 400 mm/min
Rotation speed of electrophotographic photoreceptor: 450 rpm
Indentation of electrophotographic photoreceptor pressed on backup roller; 3.5 mm
Rotation direction of polishing sheet and electrophotographic photoreceptor; width backup roller; outer diameter of 100 mm, Asker C hardness of 25

As the polishing sheet mounted on the polishing apparatus, a polishing sheet GC 3000 (surface roughness Ra of the polishing sheet: 0.83 µm) manufactured by RIKEN CORUNDUM CO., LTD. was used.

The surface of the electrophotographic photoreceptor was polished for 10 seconds under the condition described above, thereby preparing an electrophotographic photoreceptor of Example C8 whose surface was roughened by polishing. In addition, the evaluation of abrasion loss, the evaluation of scratched images, the evaluation of 17-gradation images, and the evaluation of potential variation were performed. The results are shown in Table 2.

Example C9

Until the formation of a surface layer, the same procedure as in Example C1 was performed.

Then, the surface of the electrophotographic photoreceptor was processed. In the pressure-contact shape transfer processing apparatus having the configuration illustrated in FIG. 2, a mold having the shape illustrated in FIG. 3A to FIG. 3C was installed (in the present example, the mold had projections each having a maximum width X': 30 µm (in a case where a projection of the mold is seen from above, X' means a maximum width of the projection in the axial direction; the same is applied to the following description), a maximum length Y: 75 µm (in a case where a projection of the mold is seen from above, Y means a maximum length of the projection in the circumferential direction: the same is applied to the following description), an area ratio: 60%, and a height H: 1.6 µm). The peripheral surface of the prepared electrophotographic photoreceptor, on which depressions had not yet been formed, was processed to form depressions.

In this way, an electrophotographic photoreceptor of Example C9 having depression formed on the surface thereof through processing was prepared, and the evaluation of abrasion loss, the evaluation of scratched images, the evaluation of 17-gradation images, and the evaluation of potential variation were performed. The results are shown in Table 2.

Example C10

An electrophotographic photoreceptor of Example C10 was prepared in the same manner as in Example C1, except that in Example C1, the amount of the trimethylolpropane triacrylate used in the coating liquid for a surface layer was changed to 11.1 parts, and the amount of the example compound (A-1) was changed to 1.00 part. In addition, the evaluation of abrasion loss, the evaluation of scratched images, the evaluation of 17-gradation images, and the evaluation of potential variation were performed. The results are shown in Table 2.

Example C11

An electrophotographic photoreceptor of Example C1 was prepared in the same manner as in Example C1, except that in Example C1, the amount of the trimethylolpropane triacrylate used in the coating liquid for a surface layer was changed to 2.1 parts, and the amount of the example compound (A-1) was changed to 10.00 parts. In addition, the evaluation of abrasion loss, the evaluation of scratched images, the evaluation of 17-gradation images, and the evaluation of potential variation were performed. The results are shown in Table 2.

Example C12

An electrophotographic photoreceptor of Example C12 was prepared in the same manner as in Example C1, except that in Example C1, the compound represented by the example compound (A-1) used in the coating liquid for a surface layer was changed to the example compound (A-2). In addition, the evaluation of abrasion loss, the evaluation of scratched images, the evaluation of 17-gradation images, and the evaluation of potential variation were performed. The results are shown in Table 2.

Example C13

An electrophotographic photoreceptor of Example C13 was prepared in the same manner as in Example C1, except that in Example C1, the compound represented by the example compound (A-1) used in the coating liquid for a surface layer was changed to an example compound (A-14). In addition, the evaluation of abrasion loss, the evaluation of scratched images, the evaluation of 17-gradation images, and the evaluation of potential variation were performed. The results are shown in Table 2.

Example C14

An electrophotographic photoreceptor of Example C14 was prepared in the same manner as in Example C1, except that in Example C1, the amount of the trimethylolpropane triacrylate used in the coating liquid for a surface layer was changed to 0.2 parts, and the amount of the example compound (A-1) was changed to 11.90 parts. In addition, the evaluation of abrasion loss, the evaluation of scratched images, the evaluation of 17-gradation images, and the evaluation of potential variation were performed. The results are shown in Table 2.

Example C15

Until the formation of a charge transport layer, the same procedure as in Example A1 was performed.

Then, a dispersion liquid of resin particles containing fluorine atoms was obtained in the same manner as in Example A1.

Thereafter, 57.8 parts of a charge transport compound represented by the example compound (C-2), 11.9 parts of trimethylolpropane triacrylate, 0.10 part of a compound represented by the example compound (A-1), 0.10 parts of a compound represented by Formula (13), 0.10 parts of a siloxane-modified acryl resin (trade name: SYMAC US-270, manufactured by TOAGOSEI CO., LTD.), 52 parts of 1,1,2,2,3,3,4-heptafluorocyclopentane, and 70 parts of 1-propanol were added to the dispersion liquid. Thereafter, the dispersion liquid was filtered through a Polyflon filter (trade name: PF-040, manufactured by Advantec Toyo Kaisha, Ltd.), thereby preparing a coating liquid for a surface layer.

By dip-coating the aforementioned charge transport layer with the coating liquid for a surface layer, a coating film was formed. Furthermore, in the same manner as in Example A1, a surface layer having a film thickness of 5 μm was formed.

In this way, an electrophotographic photoreceptor of Example C15 having an under coating layer, a charge generating layer, a charge transport layer, and a surface layer on an electro-conductive support was prepared, and the evaluation of abrasion loss, the evaluation of scratched images, the evaluation of 17-gradation images, and the evaluation of potential variation were performed. The results are shown in Table 2.

Example C16

An electrophotographic photoreceptor of Example C16 was prepared in the same manner as in Example C1, except that in Example C1, the amount of the trimethylolpropene triacrylate used in the coating liquid for a surface layer was changed to 11.1 parts, and the amount of the siloxane-modified acryl resin was changed to 1.00 part. In addition, the evaluation of abrasion loss, the evaluation of scratched images, the evaluation of 17-gradation images, and the evaluation of potential variation were performed. The results are shown in Table 2.

Example C17

An electrophotographic photoreceptor of Example C17 was prepared in the same manner as in Example C16, except that in Example C16, the siloxane-modified acryl resin used in the coating liquid for a surface layer was changed to a siloxane-modified acryl resin (trade name: BYK-3550, manufactured by BYK-Chemie Japan K.K.). In addition, the evaluation of abrasion loss, the evaluation of scratched images, the evaluation of 17-gradation images, and the evaluation of potential variation were performed. The results are shown in Table 2.

Example D1

An electrophotographic photoreceptor of Example D1 was prepared in the same manner as in Example C1, except that in Example C1, the amount of the charge transport compound (example compound (C-2)) used in the coating liquid for a surface layer was changed to 57.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D2

An electrophotographic photoreceptor of Example D2 was prepared in the same manner as in Example C2, except that in Example C2, the amount of the charge transport compound (example compound (C-4)) used in the coating liquid for a surface layer was changed to 57.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D3

An electrophotographic photoreceptor of Example D3 was prepared in the same manner as in Example C3, except that in Example C3, the amount of the charge transport compound (example compound (C-17)) used in the coating liquid for a surface layer was changed to 57.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D4

An electrophotographic photoreceptor of Example D4 was prepared in the same manner as in Example C4, except that in Example C4, the amount of the charge transport compound (example compound (C-2)) used in the coating liquid for a surface layer was changed to 57.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D5

An electrophotographic photoreceptor of Example D5 was prepared in the same manner as in Example C5, except that in Example C5, the amount of the charge transport compound (example compound (C-2)) used in the coating liquid for a surface layer was changed to 57.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D6

An electrophotographic photoreceptor of Example D6 was prepared in the same manner as in Example C6, except that in Example C6, the amount of the charge transport compound (example compound (C-2)) used in the coating liquid for a surface layer was changed to 57.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D7

An electrophotographic photoreceptor of Example D7 was prepared in the same manner as in Example C7, except that in Example C7, the amount of the charge transport compound (example compound (C-2)) used in the coating liquid for a surface layer was changed to 57.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D8

An electrophotographic photoreceptor of Example D8 was prepared in the same manner as in Example C8, except that in Example C8, the amount of the charge transport compound (example compound (C-2)) used in the coating liquid for a surface layer was changed to 57.9 pans, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D9

An electrophotographic photoreceptor of Example D9 was prepared in the same manner as in Example C9, except that in Example C9, the amount of the charge transport compound (example compound (C-2)) used in the coating liquid for a surface layer was changed to 57.9 pans, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D10

An electrophotographic photoreceptor of Example D10 was prepared in the same manner as in Example C10, except that in Example C10, the amount of the charge transport compound (example compound (C-2)) used in the coating liquid for a surface layer was changed to 57.9 pans, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D11

An electrophotographic photoreceptor of Example D11 was prepared in the same manner as in Example C11, except that in Example C11, the amount of the charge transport compound (example compound (C-2)) used in the coating liquid for a surface layer was changed to 57.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D12

An electrophotographic photoreceptor of Example D12 was prepared in the same manner as in Example C12, except that in Example C12, the amount of the charge transport compound (example compound (C-2)) used in the coating liquid for a surface layer was changed to 57.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D13

An electrophotographic photoreceptor of Example D13 was prepared in the same manner as in Example C13, except that in Example C13, the amount of the charge transport compound (example compound (C-2)) used in the coating liquid for a surface layer was changed to 57.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D14

An electrophotographic photoreceptor of Example D14 was prepared in the same manner as in Example C14, except that in Example C14, the amount of the charge transport compound (example compound (C-2)) used in the coating liquid for a surface layer was changed to 57.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 2.

Example D15

An electrophotographic photoreceptor of Example D15 was prepared in the same manner as in Example C15, except that in Example C5, the amount of the charge transport compound (example compound (C-2)) used in the coating liquid for a surface layer was changed to 57.9 parts, and the siloxane-modified acryl resin was not used. In addition, the evaluation of abrasion loss, the evaluation of scratched images, the evaluation of 17-gradation images, and the evaluation of potential variation were performed. The results are shown in Table 2.

Comparative Example E1

An electrophotographic photoreceptor of Comparative Example E1 was prepared in the same manner as in Example D1, except that in Example D1, the amount of the trimethylolpropane triacrylate used in the coating liquid for a surface layer was changed to 12.05 parts, and the amount of the example compound (A-1) was changed to 0.05 parts. In addition, the evaluation of abrasion loss, the evaluation of scratched images, the evaluation of 17-gradation images, and the evaluation of potential variation were performed. The results are shown in Table 2.

Comparative Example E2

An electrophotographic photoreceptor of Comparative Example E2 was prepared in the same manner as in Example D1, except that in Example D1, the example compound (A-1) used in the coating liquid for a surface layer was changed to a compound represented by Formula (15). In addition, the evaluation of abrasion loss, the evaluation of scratched images, the evaluation of 17-gradation images, and the evaluation of potential variation were performed. The results are shown in Table 2.

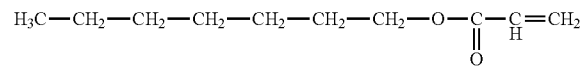

Formula (15)

Comparative Example E3

Until the formation of a charge transport layer, the same procedure as in Example A1 was performed.

Then, 2.0 parts of the resin (P-2) was dissolved in a mixed solvent of 8 parts of 1,1,2,2,3,3,4-heptafluorocyclopentane and 10 parts of 1-propanol. Thereafter, 28 parts of polytetrafluoroethylene resin particles (trade name: LUBRON L-2, manufactured by DAIKIN INDUSTRIES, LTD.) were added thereto, thereby obtaining a liquid. The liquid was put into a high-pressure disperser (trade name: MICROFLUIDIZER M-110EH, manufactured by Microfluidics) and passed through the disperser 6 times under a pressure of 40 MPa, thereby obtaining a dispersion liquid of resin particles containing fluorine atoms. The average particle diameter of the resin particles containing fluorine atoms in the obtained dispersion liquid was 0.45 μm.

Subsequently, 57.9 parts of a charge transport compound represented by the example compound (C-2), 12.0 parts of trimethylolpropane triacrylate, 0.10 parts of a compound represented by the example compound (A-1), 52 parts of 1,1,2,2,3,3,4-heptafluorocyclopentane, and 70 parts of 1-propanol were added to the dispersion liquid. Thereafter, the dispersion liquid was filtered through a Polyflon filter (trade name: PF-040, manufactured by Advantec Toyo Kaisha, Ltd.), thereby preparing a coating liquid for a surface layer.

By dip-coating the aforementioned charge transport layer with the coating liquid for a surface layer, a coating film was formed. Furthermore, in the same manner as in Example A1, a surface layer having a film thickness of 5 μm was formed In this way, an electrophotographic photoreceptor of Comparative Example E3 having an under coating layer, a charge generating layer, a charge transport layer, and a surface layer on an electro-conductive support was prepared, and the evaluation of abrasion loss, the evaluation of scratched images, the evaluation of 17-gradation images, and the evaluation of potential variation were performed. The results are shown in Table 2.

TABLE 2

| | Abresion loss (μm) | Occurrence of scratched image | Rank in 17-gradation image | Potential variation (V) |
|---|---|---|---|---|
| Example C1 | 1.6 | No scratched image occured in 200,000 sheets | A | 20 |
| Example C2 | 1.6 | No scratched image occured in 200,000 sheets | A | 20 |
| Example C3 | 1.6 | No scratched image occured in 200,000 sheets | A | 20 |
| Example C4 | 1.6 | No scratched image occured in 200,000 sheets | A | 20 |
| Example C5 | 1.6 | No scratched image occured in 200,000 sheets | A | 20 |
| Example C6 | 1.6 | No scratched image occured in 200,000 sheets | A | 20 |
| Examale C7 | 1.6 | No scratched image occured in 200,000 sheets | A | 20 |
| Examale C8 | 1.4 | No scratched image occured in 200,000 sheets | A | 20 |
| Example C9 | 1.4 | No scratched image occured in 200,000 sheets | A | 20 |
| Example C10 | 1.6 | No scratched image occured in 200,000 sheets | A | 20 |
| Example C11 | 1.6 | No scratched image occured in 200,000 sheets | A | 20 |
| Example C12 | 1.8 | No scratched image occured in 200,000 sheets | A | 25 |
| Example C13 | 1.8 | No scratched image occured in 200,000 sheets | A | 25 |
| Example C14 | 2.0 | No scratched image occured in 200,000 sheets | A | 25 |
| Example C15 | 1.6 | No scratched image occured in 200,000 sheets | A | 20 |
| Example C16 | 1.6 | No scratched image occured in 200,000 sheets | A | 20 |
| Example C17 | 1.6 | No scratched image occured in 200,000 sheets | A | 20 |
| Example D1 | 1.6 | No scratched image occured in 200,000 sheets | B | 20 |
| Example D2 | 1.6 | No scratched image occured in 200,000 sheets | B | 20 |
| Example D3 | 1.6 | No scratched image occured in 200,000 sheets | B | 20 |
| Example D4 | 1.6 | No scratched image occured in 200,000 sheets | B | 20 |
| Example D5 | 1.6 | No scratched image occured in 200,000 sheets | B | 20 |
| Example D6 | 1.6 | No scratched image occured in 200,000 sheets | B | 20 |
| Example D7 | 1.6 | No scratched image occured in 200,000 sheets | B | 20 |
| Example D8 | 1.4 | No scratched image occured in 200,000 sheets | B | 20 |
| Example D9 | 1.4 | No scratched image occured in 200,000 sheets | B | 20 |
| Example D10 | 1.6 | No scratched image occured in 200,000 sheets | B | 20 |
| Example D11 | 1.6 | No scratched image occured in 200,000 sheets | B | 20 |
| Example D12 | 1.8 | No scratched image occured in 200,000 sheets | B | 25 |
| Example D13 | 1.8 | No scratched image occured in 200,000 sheets | B | 25 |
| Example D14 | 2.0 | No scratched image occured in 200,000 sheets | B | 25 |
| Example D15 | 1.6 | No scratched image occured in 200,000 sheets | B | 20 |
| Comparative Example E1 | 1.6 | No scratched image occured in 200,000 sheets | D | 35 |

TABLE 2-continued

|  | Abresion loss (μm) | Occurrence of scratched image | Rank in 17-gradation image | Potential variation (V) |
|---|---|---|---|---|
| Comparative Example E2 | 1.6 | No scratched image occured in 200,000 sheets | D | 35 |
| Comparative Example E3 | 1.6 | Scratched image occurred in 100,000 sheets | D | 40 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-176217, filed Sep. 20, 2018, which is hereby incorporated by reference herein in its entirety.

What is claimed is:

1. An electrophotographic photoreceptor comprising:
a support; and
a photosensitive layer,
wherein a surface layer of the electrophotographic photoreceptor contains a copolymer of a charge transport compound having 2 or more polymerizable functional groups and a compound represented by General Formula (1) in a composition which contains resin particles containing fluorine atoms, the charge transport compound having 2 or more polymerizable functional groups, the compound represented by General Formula (1),

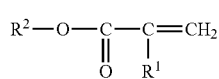

General Formula (1)

where, in General Formula (1), $R^1$ represents one of a hydrogen atom and a methyl group, and $R^2$ represents an alkyl group having 3 carbon atoms, and a resin having a structure represented by General Formula (2) and a structure represented by General Formula (3),

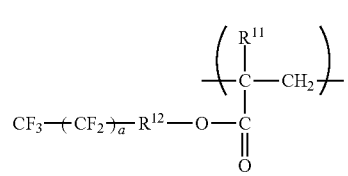

General Formula (2)

where, in General Formula (2), $R^{11}$ represents one of a hydrogen atom and a methyl group, $R^{12}$ represents an alkylene group having 1 or more to 4 or less carbon atoms, and a is any integer among 3 to 5,

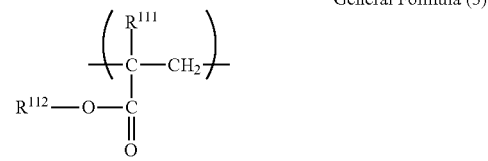

General Formula (3)

where, in General Formula (3), $R^{111}$ represents one of a hydrogen atom and a methyl group, and $R^{112}$ represents an alkyl group having 1 or more to 9 or less carbon atoms,
wherein the polymerizable functional groups are independently selected from an acryloyloxy group and a methacryloyloxy group, and
wherein a content of the compound represented by General Formula (1) in the composition is 0.10% by mass or more.

2. The electrophotographic photoreceptor according to claim 1, wherein a content of the charge transport compound in the composition is 58.0% by mass or more to 99.0% by mass or less.

3. The electrophotographic photoreceptor according to claim 1, wherein the composition further contains a siloxane-modified acryl resin, and a content of the siloxane-modified acryl resin in the composition is 0.10% by mass or more.

4. The electrophotographic photoreceptor according to claim 1, wherein the content of the compound represented by General Formula (1) in the composition is 0.10% by mass or more to 10.0% by mass or less.

5. The electrophotographic photoreceptor according to claim 1, wherein $R^2$ in General Formula (1) represents an n-propyl group.

6. The electrophotographic photoreceptor according to claim 1, wherein the composition further contains a compound represented by General Formula (6),

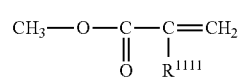

General Formula (6)

where, in General Formula (6), $R^{1111}$ represents one of a hydrogen atom and a methyl group.

7. A manufacturing method of an electrophotographic photoreceptor, comprising:
preparing a coating liquid for a surface layer;
forming a coating film of the coating liquid for a surface layer; and
forming a surface layer of the electrophotographic photoreceptor by curing the coating film,
wherein the coating liquid contains a composition which contains resin particles containing fluorine atoms, a charge transport compound having 2 or more polymerizable functional groups, a compound represented by General Formula (1),

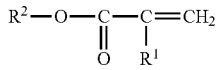
General Formula (1)

where, in General Formula (1), $R^1$ represents one of a hydrogen atom and a methyl group, and $R^2$ represents an alkyl group having 3 carbon atoms, and a resin having a structure represented by General Formula (2) and a structure represented by General Formula (3),

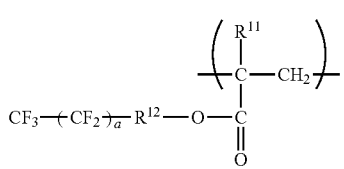
General Formula (2)

where, in General Formula (2), $R^{11}$ represents one of a hydrogen atom and a methyl group, $R^{12}$ represents an alkylene group having 1 or more to 4 or less carbon atoms, and a is any integer among 3 to 5,

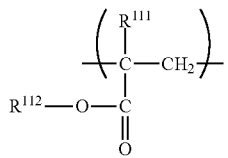
General Formula (3)

where, in General Formula (3), $R^{111}$ represents one of a hydrogen atom and a methyl group, and $R^{112}$ represents an alkyl group having 1 or more to 9 or less carbon atoms,
wherein the polymerizable functional groups are independently selected from an acryloyloxy group and a methacryloyloxy group,
wherein a content of the compound represented by General Formula (1) in the composition is 0.10% by mass or more, and
wherein the surface layer contains a copolymer of the charge transport compound having 2 or more polymerizable functional groups and the compound represented by General Formula (1) in the composition.

8. A process cartridge which supports an electrophotographic photoreceptor and at least one unit selected from the group including a charging unit, a developing unit, a transfer unit, and a cleaning unit as a whole and is detachably mounted on the body of an electrophotographic apparatus,
the electrophotographic photoreceptor comprising a support and a photosensitive layer,
wherein a surface layer of the electrophotographic photoreceptor contains a copolymer of a charge transport compound having 2 or more polymerizable functional groups and a compound represented by General Formula (1) in a composition which contains resin particles containing fluorine atoms, the charge transport compound having 2 or more polymerizable functional groups, the compound represented by General Formula (1),

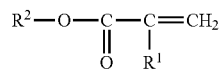
General Formula (1)

where, in General Formula (1), $R^1$ represents one of a hydrogen atom and a methyl group, and $R^2$ represents an alkyl group having 3 carbon atoms, and a resin having a structure represented by General Formula (2) and a structure represented by General Formula (3),

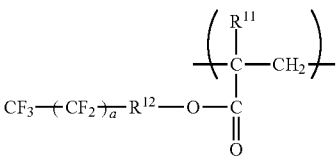
General Formula (2)

where, in General Formula (2), $R^{11}$ represents one of a hydrogen atom and a methyl group, $R^{12}$ represents an alkylene group having 1 or more to 4 or less carbon atoms, and a is any integer among 3 to 5,

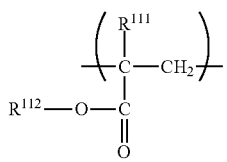
General Formula (3)

where, in General Formula (3), $R^{111}$ represents one of a hydrogen atom and a methyl group, and $R^{112}$ represents an alkyl group having 1 or more to 9 or less carbon atoms,
wherein the polymerizable functional groups are independently selected from an acryloyloxy group and a methacryloyloxy group, and
wherein a content of the compound represented by General Formula (1) in the composition is 0.10% by mass or more.

9. An electrophotographic apparatus comprising:
an electrophotographic photoreceptor;
a charging unit;
an exposing unit;
a developing unit; and
a transfer unit,
wherein the electrophotographic photoreceptor includes a support and a photosensitive layer,
wherein a surface layer of the electrophotographic photoreceptor contains a copolymer of a charge transport compound having 2 or more polymerizable functional groups and a compound represented by General Formula (1) in a composition which contains resin particles containing fluorine atoms, the charge transport compound having 2 or more polymerizable functional groups, the compound represented by General Formula (1),

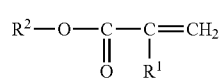
General Formula (1)

where, in General Formula (1), $R^1$ represents one of a hydrogen atom and a methyl group, and $R^2$ represents an alkyl group having 3 carbon atoms, and a resin having a structure represented by General Formula (2) and a structure represented by General Formula (3),

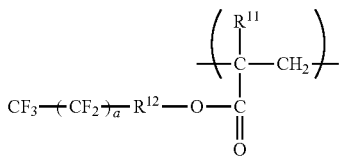

General Formula (2)

where, in General Formula (2), $R^{11}$ represents one of a hydrogen atom and a methyl group, $R^{12}$ represents an alkylene group having 1 or more to 4 or less carbon atoms, and a is any integer among 3 to 5,

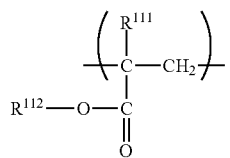

General Formula (3)

where, in General Formula (3), $R^{111}$ represents one of a hydrogen atom and a methyl group, and $R^{112}$ represents an alkyl group having 1 or more to 9 or less carbon atoms,
wherein the polymerizable functional groups are independently selected from an acryloyloxy group and a methacryloyloxy group, and
wherein a content of the compound represented by General Formula (1) in the composition is 0.10% by mass or more.

10. The manufacturing method according to claim 7, wherein $R^2$ in General Formula (1) represents an n-propyl group.

* * * * *